United States Patent
Ishida et al.

(10) Patent No.: US 11,560,950 B2
(45) Date of Patent: Jan. 24, 2023

(54) SEALING MECHANISM

(71) Applicant: MITSUBISHI HEAVY INDUSTRIES, LTD., Tokyo (JP)

(72) Inventors: Tomohiro Ishida, Tokyo (JP); Hikaru Kurosaki, Tokyo (JP); Hiroyuki Sakamoto, Tokyo (JP); Hiroshi Katsuura, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 382 days.

(21) Appl. No.: 16/982,238

(22) PCT Filed: Sep. 6, 2019

(86) PCT No.: PCT/JP2019/035194
§ 371 (c)(1),
(2) Date: Sep. 18, 2020

(87) PCT Pub. No.: WO2021/044614
PCT Pub. Date: Mar. 11, 2021

(65) Prior Publication Data
US 2022/0243817 A1 Aug. 4, 2022

(51) Int. Cl.
*F16J 15/08* (2006.01)
(52) U.S. Cl.
CPC ................. *F16J 15/0887* (2013.01)
(58) Field of Classification Search
CPC .... F16J 15/00; F16J 15/02; F16J 15/06; F16J 15/08; F16J 15/0806; F16J 15/0825;
(Continued)

(56) References Cited

U.S. PATENT DOCUMENTS

| 3,522,950 A * | 8/1970 | Schneck, Jr. ............. F16J 9/28 92/248 |
| 6,206,572 B1 * | 3/2001 | Kobayashi ............ F16C 33/107 384/114 |
| 9,708,922 B1 * | 7/2017 | Davis ................... F01D 11/005 |

FOREIGN PATENT DOCUMENTS

| DE | 102 19 865 | 3/2005 |
| JP | 2008-309199 | 12/2008 |
| JP | 2019-206984 | 12/2019 |

OTHER PUBLICATIONS

Office Action dated Mar. 7, 2022, issued in counterpart DE Application No. 112019000897.8 with English translation.
(Continued)

*Primary Examiner* — Nathan Cumar
(74) *Attorney, Agent, or Firm* — Wenderoth, Lind & Ponack, L.L.P.

(57) ABSTRACT

A sealing mechanism including a first seal member, a second seal member arranged so as to face the first seal member, and a deformed nucleus member arranged in a space formed at least partially between the first seal member and the second seal member, and becoming a nucleus of deformation in the sealing mechanism. The deformed nucleus member is configured by a combination of rod-like members and plate-like members respectively formed from a plurality of materials having different linear expansion coefficients, and is fixed to each of the first seal member and the seal member. The deformed nucleus member contracts in at least one direction on a cross-section of the seal groove, along with an increase in temperature of the deformed nucleus member. The first seal member and the second seal member respectively have abutment surfaces abutting on an inner surface of the seal groove or the facing surfaces.

10 Claims, 17 Drawing Sheets

(58) Field of Classification Search
CPC ...... F16J 15/0887; F16J 15/0893; F16J 15/16; F16J 15/50; F16J 15/52
USPC ....................................................... 277/360
See application file for complete search history.

(56) References Cited

OTHER PUBLICATIONS

Gough-Joule-Effekt. Oct. 7, 2019, Wikipedia, Die freie Enzyklopädie [online] cited in DE Office Action (CA).
Georgi et al., Festkörper mit negativer thermischer Ausdehnung. In:Thüringer Werkstofftag 2004, 2004, pp. 63-68 cited in DE Office Action (CA).

* cited by examiner

SEALING MECHANISM

TECHNICAL FIELD

The present disclosure relates to a sealing mechanism.

BACKGROUND

For example, in a compressor, a gas turbine, or a steam turbine, a seal plate is installed on a horizontal flange surface of a casing in order to prevent an inner fluid from leaking to between stages or to the outside. However, since tolerance needed for assembly of the horizontal flange surface and the seal plate is generally provided, it is impossible to completely prevent leakage of the fluid. Thus, the installation of the seal plate mainly aims at reducing a leakage amount.

Patent Document 1 describes that, in a bearing structure including a bearing part and a shaft fitted to the bearing part, the bearing part is at least partially formed of a thermal expansion material which has a negative thermal expansion coefficient in a range from a low temperature region to a medium temperature region and a positive thermal expansion coefficient in a range from the medium temperature region to a high temperature region, or the shaft is at least partially formed of a thermal expansion material which has a positive thermal expansion coefficient in a range from the low temperature region to the medium temperature region and a negative thermal expansion coefficient in a range from the medium temperature region to the high temperature region. With the above configuration, it is possible to suppress friction between the shaft and the bearing part in the low temperature region, and to suppress the flow-out of oil and the run-out of an oil film in the high temperature region.

CITATION LIST

Patent Literature

Patent Document 1: JP2008-309199A

SUMMARY

Technical Problem

However, the problem arises in that manganese nitride, zirconium tungstate, silicon oxide, and the like each having an antiperovskite structure are given as the thermal expansion materials used in Patent Document 1, and since these materials are expensive, the cost of a sealing mechanism increases.

In view of the above, an object of at least one embodiment of the present disclosure is to provide an inexpensive sealing mechanism capable of exerting sealing performance needed at the time of a temperature increase.

Solution to Problem (1) A sealing mechanism according to at least one embodiment of the present invention is a sealing mechanism inserted into a seal groove formed between facing surfaces of two members, the sealing mechanism including a first seal member, a second seal member arranged so as to face the first seal member, and a deformed nucleus member arranged in a space formed at least partially between the first seal member and the second seal member, and becoming a nucleus of deformation in the sealing mechanism, the deformed nucleus member being configured by a combination of a plurality of rod-like members and plate-like members respectively formed from a plurality of materials having different linear expansion coefficients, and being fixed to each of the first seal member and the seal member. The deformed nucleus member contracts in at least one direction on a cross-section of the seal groove, along with an increase in temperature of the deformed nucleus member. The first seal member and the second seal member respectively have abutment surfaces abutting on an inner surface of the seal groove or the facing surfaces, accompanied by the contraction of the deformed nucleus member.

With the above configuration (1), since, accompanied by the contraction of the deformed nucleus member along with the increase in temperature of the deformed nucleus member, the abutment surfaces formed in the first seal member and the second seal member, respectively, abut on the inner surface of the seal groove or the facing surfaces, it is possible to exert sealing performance needed at the time of the temperature increase. Moreover, since the first seal member and the second seal member can be formed by a material capable of withstanding the temperature increase, and the deformed nucleus member can be formed from the plurality of materials capable of withstanding the temperature increase and having the different linear expansion coefficients, no particularly expensive materials are needed. Thus, it is possible to inexpensively provide the sealing mechanism.

(2) In some embodiments, in the above configuration (1), the first seal member has a substantially L-shaped cross-sectional shape, which is formed by connecting a plate-like first portion and a plate-like second portion to each other, the second seal member has a substantially L-shaped cross-sectional shape, which is formed by connecting a plate-like third portion facing the first portion and a plate-like fourth portion facing the second portion to each other, the deformed nucleus member is fixed to each of the first portion and the third portion, and contracts such that a distance between the first portion and the third portion decreases, along with the increase in temperature of the deformed nucleus member, accompanied by the contraction of the deformed nucleus member, an edge of the second portion facing a connection part with the first portion and an edge of the fourth portion facing a connection part with the third portion abut on the inner surface of the seal groove or the facing surfaces, and the abutment surfaces are formed at the edge of the second portion and the edge of the fourth portion, respectively.

With the above configuration (2), since sealing is performed by making the abutment surfaces formed at the edge of the second portion and the edge of the fourth portion, respectively, abut on the inner surface of the seal groove or the facing surfaces, accompanied by the contraction of the deformed nucleus member where the distance between the first portion of the first seal member and the third portion of the second seal member decreases, it is possible to provide a clearance between at least one of the edge of the second portion or the edge of the fourth portion, and the inner surface of the seal groove or the facing surfaces, Thus, it is possible to exert the sealing performance needed at the time of the temperature increase, even if tolerance needed for assembly of the sealing mechanism is sufficiently ensured.

(3) In some embodiments, in the above configuration (2), the deformed nucleus member further expands such that a distance between the second portion and the fourth portion increases, along with the increase in temperature of the deformed nucleus member, and accompanied by the expansion of the deformed nucleus member, respective external surfaces on opposite sides to respective internal surfaces of the second portion and the fourth portion abut on the inner surface of the seal groove or the facing surfaces, the respective internal surfaces facing the deformed nucleus member, and the abutment surfaces are further formed on the external surface of the second portion and the external surface of the fourth portion, respectively.

With the above configuration (3), sealing is performed not only by making the abutment surfaces formed at the edge of the second portion and the edge of the fourth portion, respectively, abut on the inner surface of the seal groove or the facing surfaces, but also by making the abutment surfaces formed on the external surfaces of the second portion and the fourth portion, respectively, abut on the inner surface of the seal groove or the facing surfaces, accompanied by the expansion of the deformed nucleus member where the distance between the second portion of the first seal member and the fourth portion of the second seal member increases. Thus, it is possible to improve the sealing performance needed at the time of the temperature increase.

(4) In some embodiments, in the above configuration (3), in at least one of the external surface of the second portion and the external surface of the fourth portion, a recess is formed, which is recessed with respect to the inner surface of the seal groove or the facing surfaces.

With the above configuration (4), since the recess is formed in the at least one of the external surface of the second portion and the external surface of the fourth portion, a pressure, at which the abutment surface formed on the at least one of the external surface of the second portion and the external surface of the fourth portion abuts on the inner surface of the seal groove or the facing surfaces, increases. Thus, it is possible to improve the sealing performance needed at the time of the temperature increase.

(5) In some embodiments, in any one of the above configurations (1) to (4), the sealing mechanism further includes a sealing member for sealing the space.

Since the deformed nucleus member is configured by the combination of the plurality of rod-like members and plate-like members, a gas flowing into the seal groove passes through the deformed nucleus member, thereby passing through the sealing mechanism via the space formed between the first seal member and the second seal member, which may result in gas leakage. However, with the above configuration (5), since the space is sealed by the sealing member, it is possible to suppress the passage of the gas through the sealing mechanism and to reduce the risk of the gas leakage.

(6) In some embodiments, in the above configuration (5), the sealing member has a tube shape internally including the first seal member, the second seal member, and the deformed nucleus member.

With the above configuration (6), since the sealing member is formed into the tube shape so as to internally include the first seal member, the second seal member, and the deformed nucleus member, it is possible to simplify the design of the sealing member.

(7) In some embodiments, in the above configuration (5), the sealing member seals the space, together with the first seal member and the second seal member.

With the above configuration (7), since the sealing member can be made small, as compared with the case in which the sealing member is formed into the tube shape so as to internally include the first seal member, the second seal member, and the deformed nucleus member, it is possible to reduce the cost of the sealing member.

(8) In some embodiments, in the above configuration (2), the deformed nucleus member is further fixed to each of the second portion and the fourth portion, and the deformed nucleus member further contracts such that a distance between the second portion and the fourth portion decreases, along with the increase in temperature of the deformed nucleus member, to make the first portion abut on the fourth portion and to make the third portion abut on the second portion.

Since the deformed nucleus member is configured by the combination of the plurality of rod-like members and plate-like members, a gas flowing into the seal groove passes through the deformed nucleus member, thereby passing through the sealing mechanism via the space formed between the first seal member and the second seal member, which may result in gas leakage. However, with the above configuration (8), since the deformed nucleus member contracts such that the distance between the second portion and the fourth portion decreases, along with the increase in temperature of the deformed nucleus member, to make the first portion abut on the fourth portion and to make the third portion abut on the second portion, thereby sealing the gas trying to pass through the sealing mechanism via the space. Thus, it is possible to suppress the passage of the gas through the sealing mechanism, and to reduce the risk of the gas leakage.

(9) In some embodiments, in the above configuration (1), the first seal member has a substantially L-shaped cross-sectional shape, which is formed by connecting a plate-like first portion and a plate-like second portion to each other, the second seal member has a substantially L-shaped cross-sectional shape, which is formed by connecting a plate-like third portion facing the first portion and a plate-like fourth portion facing the second portion to each other, the deformed nucleus member is fixed to each of the first portion and the third portion, and contracts such that a distance between the first portion and the third portion decreases, along with the increase in temperature of the deformed nucleus member, the inner surface of the seal groove has an abutment inner surface part forming an acute angle with the second portion, the second portion has a second abutment surface abutting on the abutment inner surface part, accompanied by the contraction of the deformed nucleus member, with the abutment of the second abutment surface on the abutment inner surface part, the first seal member pushes the second seal member to make the first portion abut on the fourth portion and to make the third portion abut on the second portion, and of a surface of the fourth portion, an external surface on an opposite side to an internal surface facing the deformed nucleus member abuts on the inner surface of the seal groove, and the abutment surfaces are formed on the external surface and the edge of the fourth portion facing a connection part with the third portion, respectively.

With the above configuration (9), since sealing is performed by making the second abutment surface abut on the abutment inner surface part, making the external surface of the fourth portion abut on the inner surface of the seal groove, and making the edge of the fourth portion abut on the inner surface of the seal groove or the facing surfaces, it is possible to improve the sealing performance needed at the time of the temperature increase, as compared with a configuration (for example, the above configuration (2)) in which sealing is performed by making the edge of the second portion and the edge of the fourth portion abut on the inner surface of the seal groove or the facing surfaces.

Moreover, since the deformed nucleus member is configured by the combination of the plurality of rod-like members and plate-like members, the gas flowing into the seal groove passes through the deformed nucleus member, thereby passing through the sealing mechanism via the space formed between the first seal member and the second seal member, which may result in the gas leakage. However, with the above configuration (9), since, with the abutment of the second abutment surface on the abutment inner surface part, the first seal member pushes the second seal member to make the first portion abut on the fourth portion and to make the third portion abut on the second portion, thereby sealing the gas trying to pass through the sealing mechanism via the space. Thus, it is possible to suppress the passage of the gas through the sealing mechanism, and to reduce the risk of the gas leakage.

(10) In some embodiments, in the above configuration (9), in the external surface of the fourth portion, a recess is formed, which is recessed with respect to the inner surface of the seal groove.

With the above configuration (10), since the recess is formed in the external surface of the fourth portion, the pressure, at which the abutment surface formed on the external surface of the fourth portion abuts on the inner surface of the seal groove, increases, it is possible to improve the sealing performance needed at the time of the temperature increase.

Advantageous Effects

According to at least one embodiment of the present disclosure, abutment surfaces formed in a first seal member and a second seal member, respectively, abut on the inner surface of a seal groove or facing surfaces, accompanied by contraction of a deformed nucleus member along with an increase in temperature of the deformed nucleus member, making it possible to exert sealing performance needed at the time of the temperature increase. Moreover, since the first seal member and the second seal member can be formed by a material capable of withstanding the temperature increase, and the deformed nucleus member can be formed from the plurality of materials capable of withstanding the temperature increase and having the different linear expansion coefficients, no particularly expensive materials are needed. Thus, it is possible to inexpensively provide the sealing mechanism.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

Embodiment 1

Figure 1:
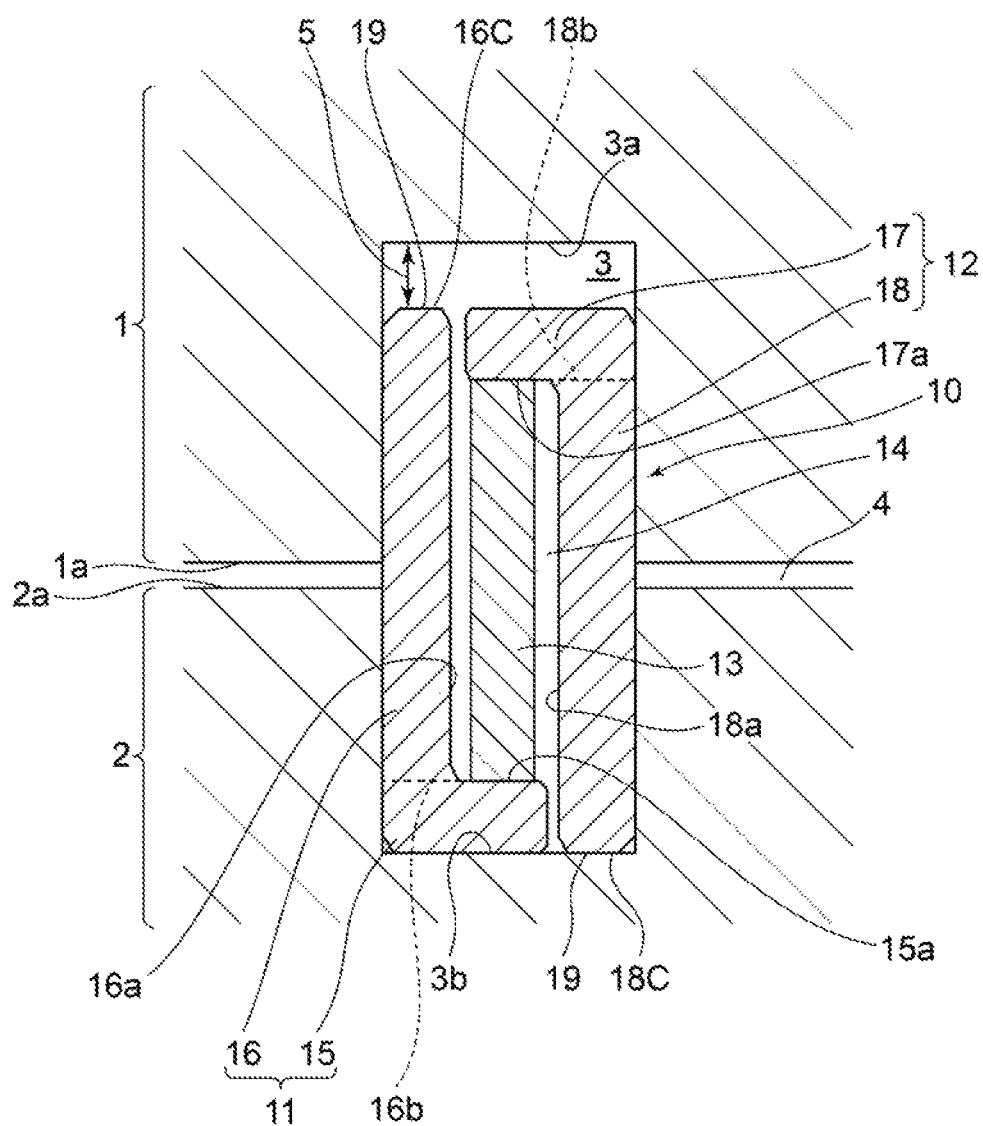
FIG. 1 is a cross-sectional view of a sealing mechanism according to Embodiment 1 of the present disclosure.

As shown in FIG. 1, a sealing mechanism 10 according to Embodiment 1 of the present disclosure is inserted into a seal groove 3, which is formed between facing surfaces 1a, 2a of two members, that is, an upper flange 1 and a lower flange 2 included in a device such as a compressor, a gas turbine, a steam turbine, or the like. The seal groove 3 is configured such that a groove part 3a formed in the facing surface 1a and a groove part 3b formed in the facing surface 2a face each other. A slight gap 4 is formed between the facing surfaces 1a, 2a, when the device is operated.

The sealing mechanism 10 includes a first seal member 11, a second seal member 12 arranged so as to face the first seal member 11, and a plate-shaped deformed nucleus member 13. The first seal member 11 has a substantially L-shaped cross-sectional shape, which is formed by connecting a plate-like first portion 15 and a plate-like second portion 16 to each other. The second seal member 12 has a substantially L-shaped cross-sectional shape, which is formed by connecting a plate-like third portion 17 facing the first portion 15 and a plate-like fourth portion 18 facing the second portion 16 to each other. The deformed nucleus member 13 is a member becoming a nucleus of deformation, when the sealing mechanism 10 is deformed on a principle to be described later.

In the present disclosure, a "plate shape" means not only a plate shape having a rectangular outer shape, but also a plate shape having any outer shape. For example, if the sealing mechanism 10 is disposed along the circumferential direction of a rotational shaft, the "plate shape" also includes a disc shape where a hole, into which the rotational shaft can be inserted, is formed.

The first portion 15, the second portion 16, the third portion 17, and the fourth portion 18 have internal surfaces 15a, 16a, 17a, 18a, respectively, facing the deformed nucleus member 13. The internal surfaces 15a, 16a, 17a, 18a define a space 14 between the first seal member 11 and the second seal member 12. The deformed nucleus member 13 is arranged in the space 14, and is fixed to the internal surface 15a of the first portion 15 and the internal surface 17a of the third portion 17. The deformed nucleus member 13, and the internal surfaces 15a and 17a may be fixed by welding, or the first seal member 11, the second seal member 12, and the deformed nucleus member 13 may integrally be formed by three-dimensional additive manufacturing or the like.

In FIG. 1, gaps are formed between the deformed nucleus member 13, and the internal surfaces 16a and 18a, respectively. However, the deformed nucleus member 13 may be in contact with each of the internal surfaces 16a and 18a. If the deformed nucleus member 13 is in contact with each of the internal surfaces 16a and 18a, the deformed nucleus member 13 may be fixed to each of the internal surfaces 16a and 18a.

Each of the first seal member 11 and the second seal member 12 can be formed by a material capable of withstanding a temperature increase, for example, general metal such as stainless steel. The deformed nucleus member 13 is configured by a combination of a plurality of rod-like members and plate-like members respectively formed from a plurality of materials (for example, stainless steel and aluminum) capable of withstanding the temperature increase and having different linear expansion coefficients. Such materials forming the deformed nucleus member 13 will be referred to as a metamaterial in the present disclosure.

Figure 2:
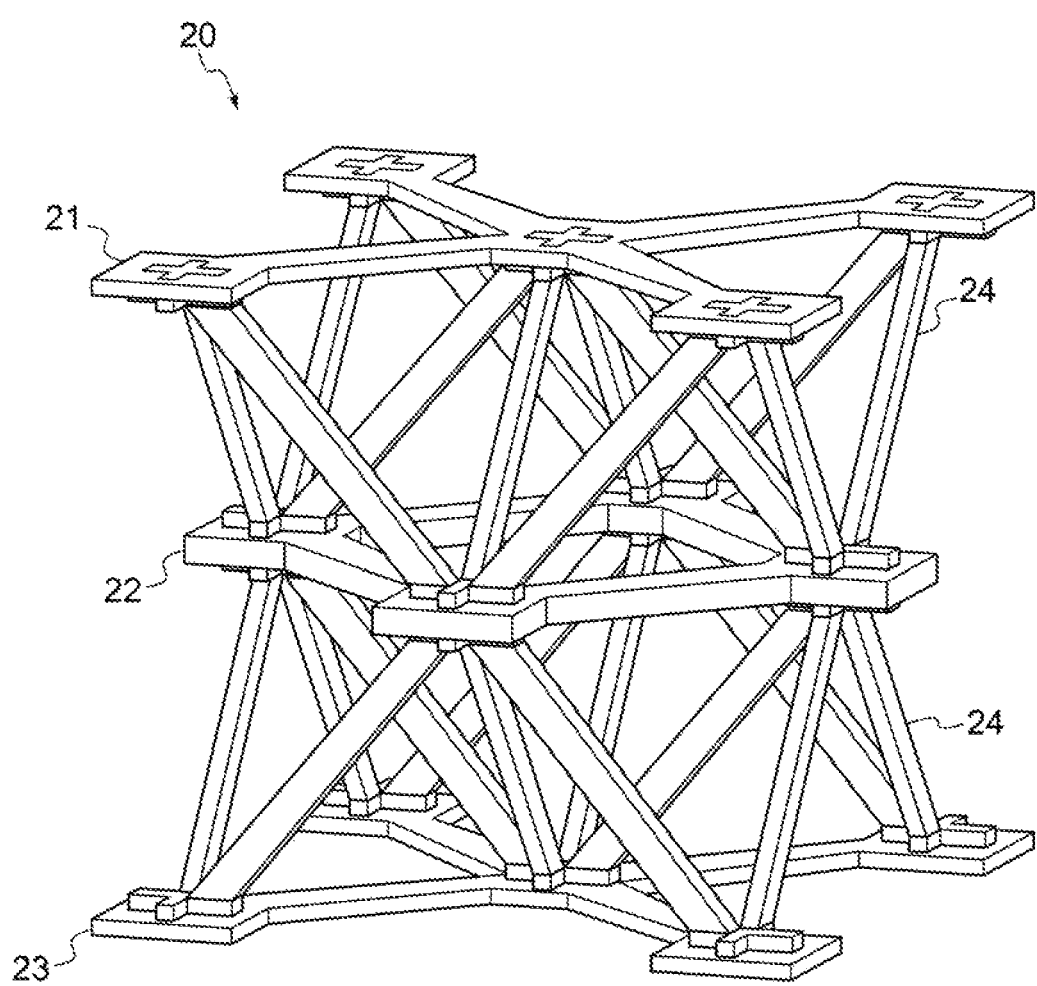
FIG. 2 is a view showing an example of the configuration of a metamaterial.

FIG. 2 shows an example of the structure of the metamaterial. A metamaterial 20 is configured by combining bases 21, 22, 23 and beams 24 with each other. The bases 21, 22, 23 are formed from the plurality of rod-like members and plate-like members, respectively. The beams 24 are formed from the plurality of rod-like members connecting the respective bases 21, 22, 23. A material forming the bases 21, 22, 23 and a material forming the beams 24 are different from each other in linear expansion coefficient. For example, it is possible to use two materials, where the linear expansion coefficient of the former material is larger than that of the latter material. Alternatively, the bases 21, 22, 23 may respectively be formed from materials having different linear expansion coefficients, and the beams 24 may respectively be formed from materials having different linear expansion coefficients. That is, the metamaterial 20 can also be made of at least three materials having different linear expansion coefficients.

The metamaterial 20 can adjust a direction and amount of deformation due to temperature, by changing the type of material to be used, or by adjusting, for example, the thickness or shape of the base 21, 22, 23 and the thickness, or length of the beams 24. For example, the metamaterial 20 can adjust contraction in one direction and expansion in the other direction, or expansion/contraction in at least two different directions, which occur along with an increase in temperature of the metamaterial 20. In Embodiment 1, using the appropriate metamaterial 20, as shown in FIG. 1, the deformed nucleus member 13 is configured to contract in a direction where a distance between the first portion 15 and the third portion 17 decreases on the cross-section of the seal groove 3, along with an increase in temperature of the deformed nucleus member 13.

Figure 3:
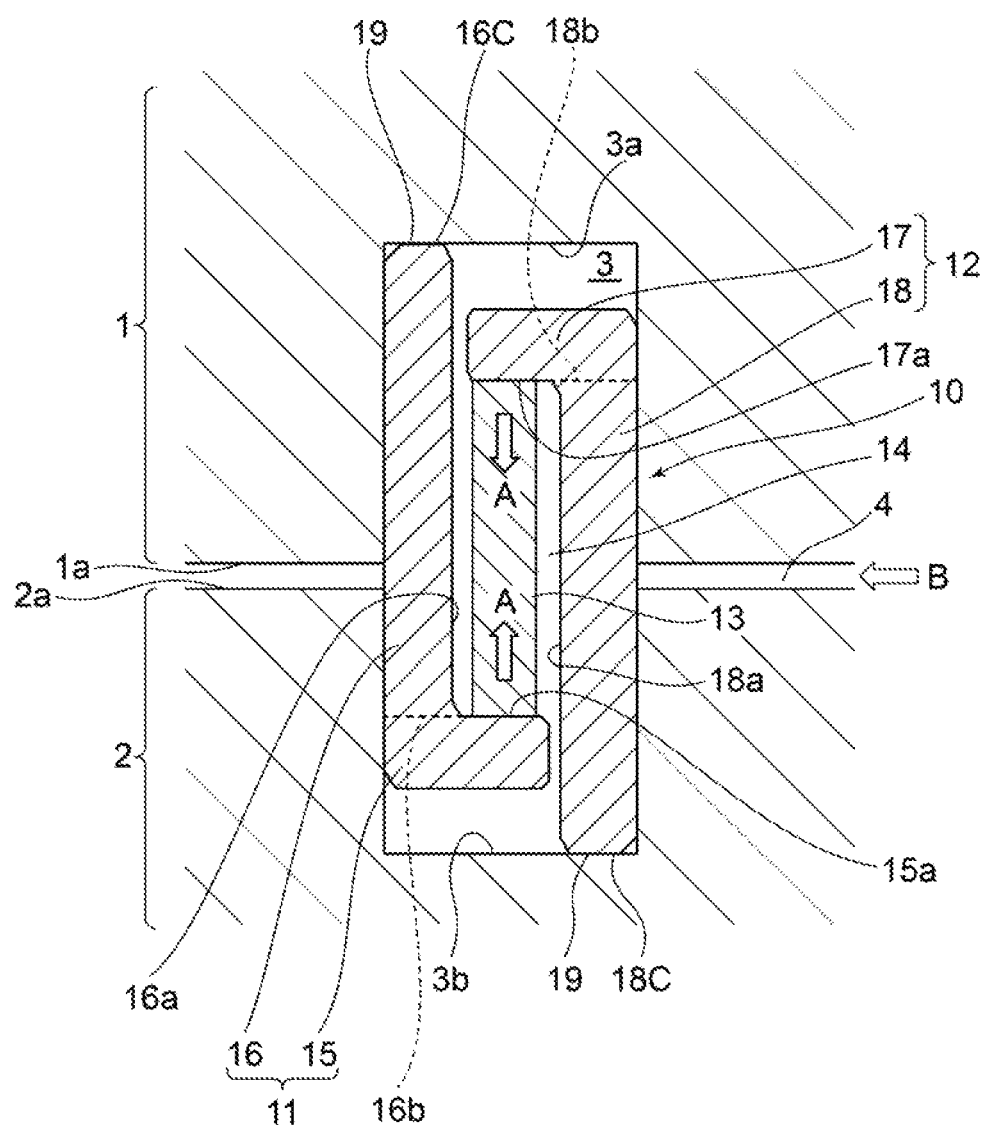
FIG. 3 is a cross-sectional view of the sealing mechanism according to Embodiment 1 of the present disclosure.

As shown in FIG. 3, if the temperature of the sealing mechanism 10 increases, and the deformed nucleus member 13 contracts in a direction where the distance between the first portion 15 and the third portion 17 decreases (a direction of arrows A) on the cross-section of the seal groove 3, the first seal member 11 and the second seal member 12 move relative to each other in a direction crossing the facing surfaces 1a and 2a, that is, in a direction perpendicular to the facing surfaces 1a and 2a, making each of the second portion 16 and the fourth portion 18 abut on the inner surface of the seal groove 3. The second portion 16 has an abutment surface 19 formed at an edge 16c facing a connection part 16b with the first portion 15. The abutment surface 19 formed at the edge 16c abuts on the inner surface of the seal groove 3. On the other hand, the fourth portion 18 has the abutment surface 19 formed at an edge 18c facing a connection part 18b with the third portion 17. The abutment surface 19 formed at the edge 18c abuts on the inner surface of the seal groove 3.

If a gas flowing through the gap 4 (in the direction of an arrow B) flows into the seal groove 3 with the abutment surfaces 19 formed at the edge 16c of the second portion 16 and the edge 18c of the fourth portion 18, respectively, abutting on the inner surface of the seal groove 3, the gas flow is sealed by a portion, where the abutment surfaces 19 abut on the inner surface of the seal groove 3, and the deformed nucleus member 13 in the seal groove 3, suppressing passage of the gas through the sealing mechanism 10.

Thus, since, accompanied by the contraction of the deformed nucleus member 13 along with the increase in temperature of the deformed nucleus member 13, the abutment surfaces 19 formed in the first seal member 11 and the second seal member 12, respectively, abut on the inner surface of the seal groove 3, it is possible to exert sealing performance needed at the time of the temperature increase. Moreover, since the first seal member 11 and the second seal member 12 can be formed by the material capable of withstanding the temperature increase, and the deformed nucleus member 13 can be formed from the plurality of materials capable of withstanding the temperature increase and having the different linear expansion coefficients, no particularly expensive materials are needed. Thus, it is possible to inexpensively provide the sealing mechanism 10.

Moreover, since sealing is performed by making the abutment surfaces 19 formed at the edge 16c of the second portion 16 and the edge 18c of the fourth portion 18, respectively, abut on the inner surface of the seal groove 3, accompanied by the contraction of the deformed nucleus member 13 where the distance between the first portion 15 and the third portion 17 decreases on the cross-section of the seal groove 3, it is possible to provide a clearance 5 between the inner surface of the seal groove 3 and at least one of the edge 16c of the second portion 16 or the edge 18c of the fourth portion 18, as shown in FIG. 1, before the temperature increase. Thus, it is possible to exert the sealing performance needed at the time of the temperature increase, even if tolerance needed for assembly of the sealing mechanism 10 is sufficiently ensured.

In Embodiment 1, the seal groove 3 is configured such that the groove part 3a formed in the facing surface 1a and the groove part 3b formed in the facing surface 2a face each other, each of the first seal member 11 and the second seal member 12 is configured to have the substantially L-shaped cross-sectional shape, and the deformed nucleus member 13 is configured to have a plate-like shape. However, the present disclosure is not limited to these configurations. Modifications 1 to 3 of Embodiment 1 will described below. In each of Modifications 1 to 3 below, the same constituent elements as those in Embodiment 1 are associated with the same reference characters and not described again in detail.

Modification 1

Figure 4:
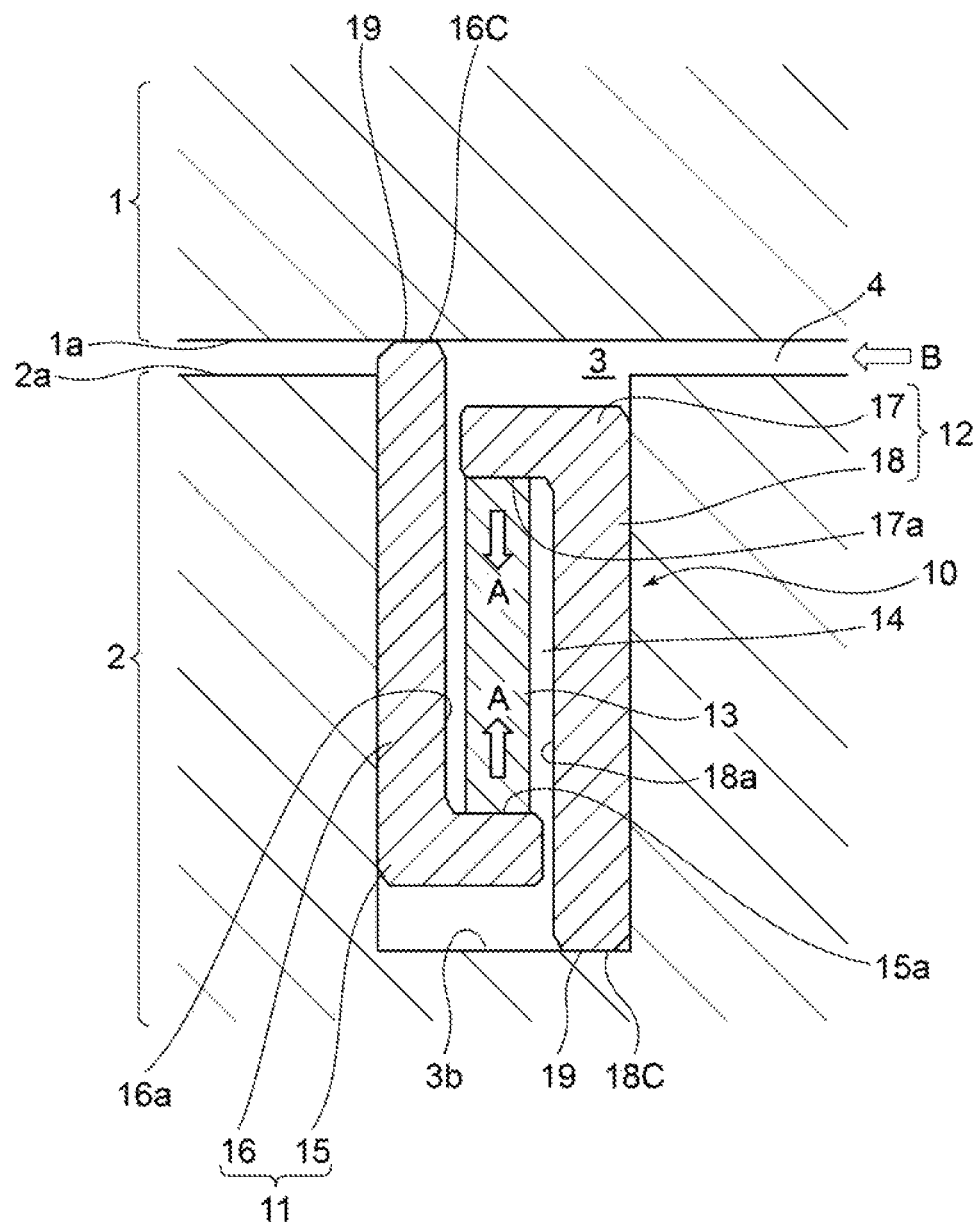
FIG. 4 is a cross-sectional view showing Modification 1 of the sealing mechanism according to Embodiment 1 of the present disclosure.

As shown in FIG. 4, the sealing mechanism 10 according to Modification 1 of Embodiment 1 is disposed in the seal groove 3 composed of only the groove part 3*b* formed in the facing surface 2*a*. That is, no groove part is formed in the facing surface 1*a*. Other configurations are the same as Embodiment 1.

In Modification 1, if the temperature of the sealing mechanism 10 increases, and the deformed nucleus member 13 contracts in the direction where the distance between the first portion 15 and the third portion 17 decreases (the direction of the arrows A) on the cross-section of the seal groove 3, the first seal member 11 and the second seal member 12 move relative to each other, making the abutment surface 19 formed at the edge 16*c* of the second portion 16 abut on the facing surface 1*a* and the abutment surface 19 formed at the edge 18*c* of the fourth portion 18 abut on the inner surface of the seal groove 3. If the gas flowing through the gap 4 (in the direction of the arrow B) is sealed by the portion, where the abutment surface 19 formed at the edge 16*c* of the second portion 16 abuts on the facing surface 1*a*, and the gas flowing through the gap 4 flows into the seal groove 3, the gas flow is sealed by a portion, where the abutment surface 19 formed at the edge 18*c* of the fourth portion 18 abuts on the inner surface of the seal groove 3, and the deformed nucleus member 13 in the seal groove 3, suppressing passage of the gas through the sealing mechanism 10.

A configuration, in which the seal groove 3 is composed of only the groove part 3*a* formed in the facing surface 1*a*, may be adopted. In this case, if the deformed nucleus member 13 contracts along with the increase in temperature thereof, the abutment surface 19 formed at the edge 16*c* of the second portion 16 abuts on the inner surface of the seal groove 3, and the abutment surface 19 formed at the edge 18*c* of the fourth portion 18 abuts on the facing surface 2*a*.

Modification 2

Figure 5:
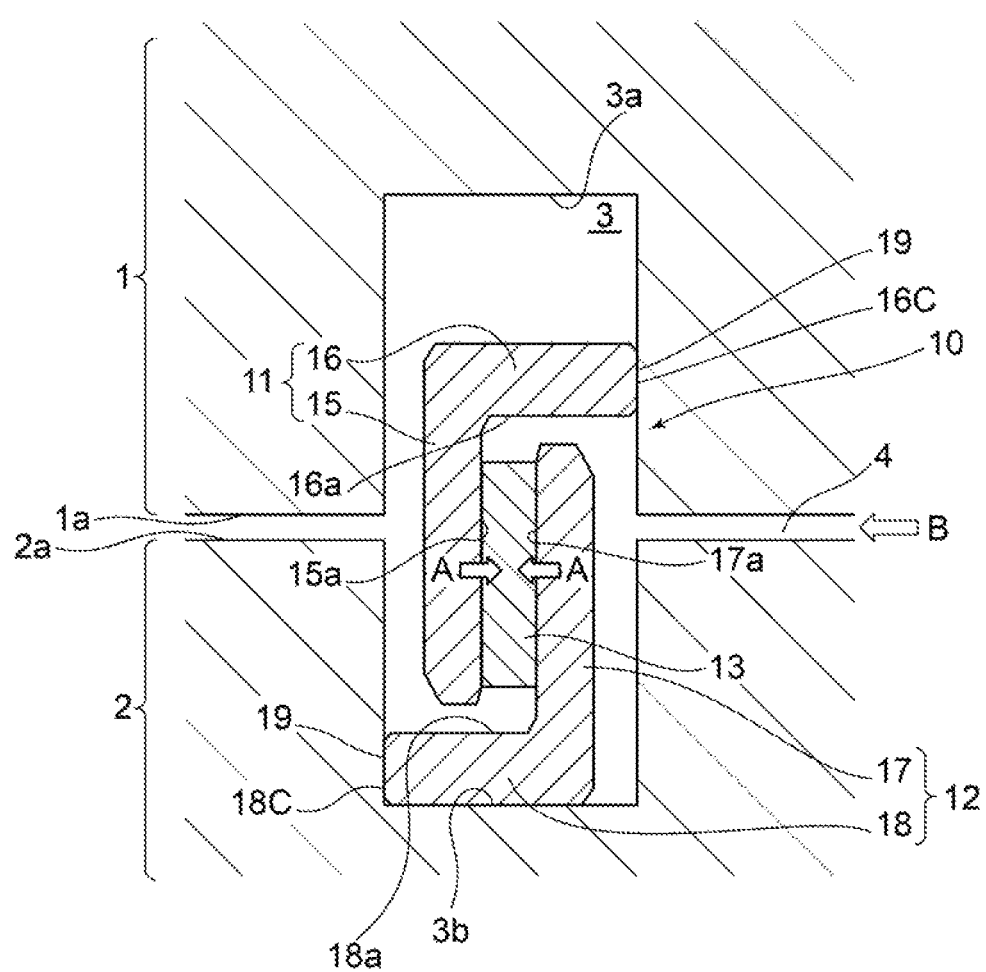
FIG. 5 is a cross-sectional view showing Modification 2 of the sealing mechanism according to Embodiment 1 of the present disclosure.

In Embodiment 1, the first seal member 11 and the second seal member 12 are disposed in the seal groove 3 such that the second portion 16 and the fourth portion 18 intersect the facing surfaces 1*a* and 2*a*, that is, are perpendicular to the facing surfaces 1*a* and 2*a*, respectively. On the other hand, in the sealing mechanism 10 according to Modification 2 of Embodiment 1, as shown in FIG. 5, the first seal member 11 and the second seal member 12 are disposed in the seal groove 3 such that the first portion 15 and the third portion 17 intersect the facing surfaces 1*a* and 2*a*, that is, are perpendicular to the facing surfaces 1*a* and 2*a*, respectively. Other configurations are the same as Embodiment 1.

In Modification 2, if the temperature of the sealing mechanism 10 increases, and the deformed nucleus member 13 contracts in the direction where the distance between the first portion 15 and the third portion 17 decreases (the direction of the arrows A) on the cross-section of the seal groove 3, the first seal member 11 and the second seal member 12 move relative to each other, making the abutment surface 19 formed at the edge 16*c* of the second portion 16 and the abutment surface 19 formed at the edge 18*c* of the fourth portion 18 abut on the inner surface of the seal groove 3. If the gas flowing through the gap 4 (in the direction of the arrow B) flows into the seal groove 3, the gas flow is sealed by a portion, where the abutment surfaces 19 abut on the inner surface of the seal groove 3 and the deformed nucleus member 13 in the seal groove 3, suppressing passage of the gas through the sealing mechanism 10.

Modification 3

Figure 6:
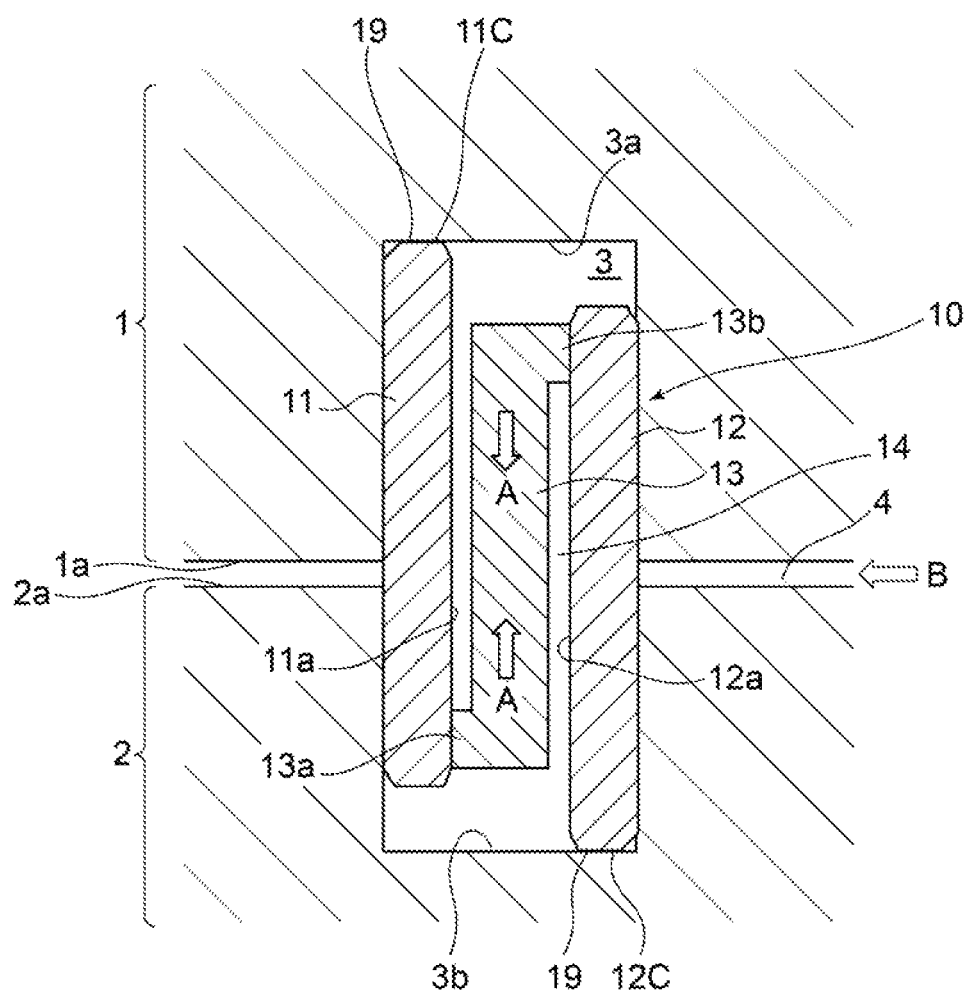
FIG. 6 is a cross-sectional view showing Modification 3 of the sealing mechanism according to Embodiment 1 of the present disclosure.

As shown in FIG. 6, the sealing mechanism 10 according to Modification 3 of Embodiment 1 includes the plate-like first seal member 11, the plate-like second seal member 12, and the deformed nucleus member 13. The deformed nucleus member 13 is arranged in the space 14 defined by the internal surface 11*a* of the first seal member 11 and the internal surface 12*a* of the second seal member 12 between the first seal member 11 and the second seal member 12. The deformed nucleus member 13 includes a protruding part 13*a* protruding toward the internal surface 11*a* and a protruding part 13*b* protruding toward the internal surface 12*a*. The protruding parts 13*a* and 13*b* are fixed to the internal surfaces 11*a* and 12*a*, respectively. Other configurations are the same as Embodiment 1.

In Modification 3, if the temperature of the sealing mechanism 10 increases, and the deformed nucleus member 13 contracts in the direction where a distance between the protruding parts 13*a* and 13*b* decreases (the direction of the arrows A) on the cross-section of the seal groove 3, the first seal member 11 and the second seal member 12 move relative to each other, making the abutment surface 19 formed at an edge 11*c* of the first seal member 11 and the abutment surface 19 formed at an edge 12*c* of the second seal member 12 abut on the inner surface of the seal groove 3. If the gas flowing through the gap 4 (in the direction of the arrow B) flows into the seal groove 3, the gas flow is sealed by a portion, where the abutment surfaces 19 abut on the inner surface of the seal groove 3 and the deformed nucleus member 13 in the seal groove 3, suppressing passage of the gas through the sealing mechanism 10.

The sealing mechanism 10 of Modification 2 can also be disposed in the seal groove 3 of Modification 1, or the sealing mechanism 10 of Modification 3 can also be disposed in the seal groove 3 of Modification 1. In each of Embodiments 2 to 6 to be described below, Embodiment 1 includes each of Modifications 1 to 3 of Embodiment 1, the combination of Modification 1 and Modification 2, and the combination of Modification 1 and Modification 3, unless particularly mentioned otherwise.

Embodiment 2

Next, the sealing mechanism according to Embodiment 2 will be described. The sealing mechanism according to Embodiment 2 is obtained by modifying Embodiment 1 in the deformed configuration of the deformed nucleus member 13 at the time of the temperature increase. In Embodiment 2, the same constituent elements as those in Embodiment 1 are associated with the same reference characters and not described again in detail.

Figure 7:
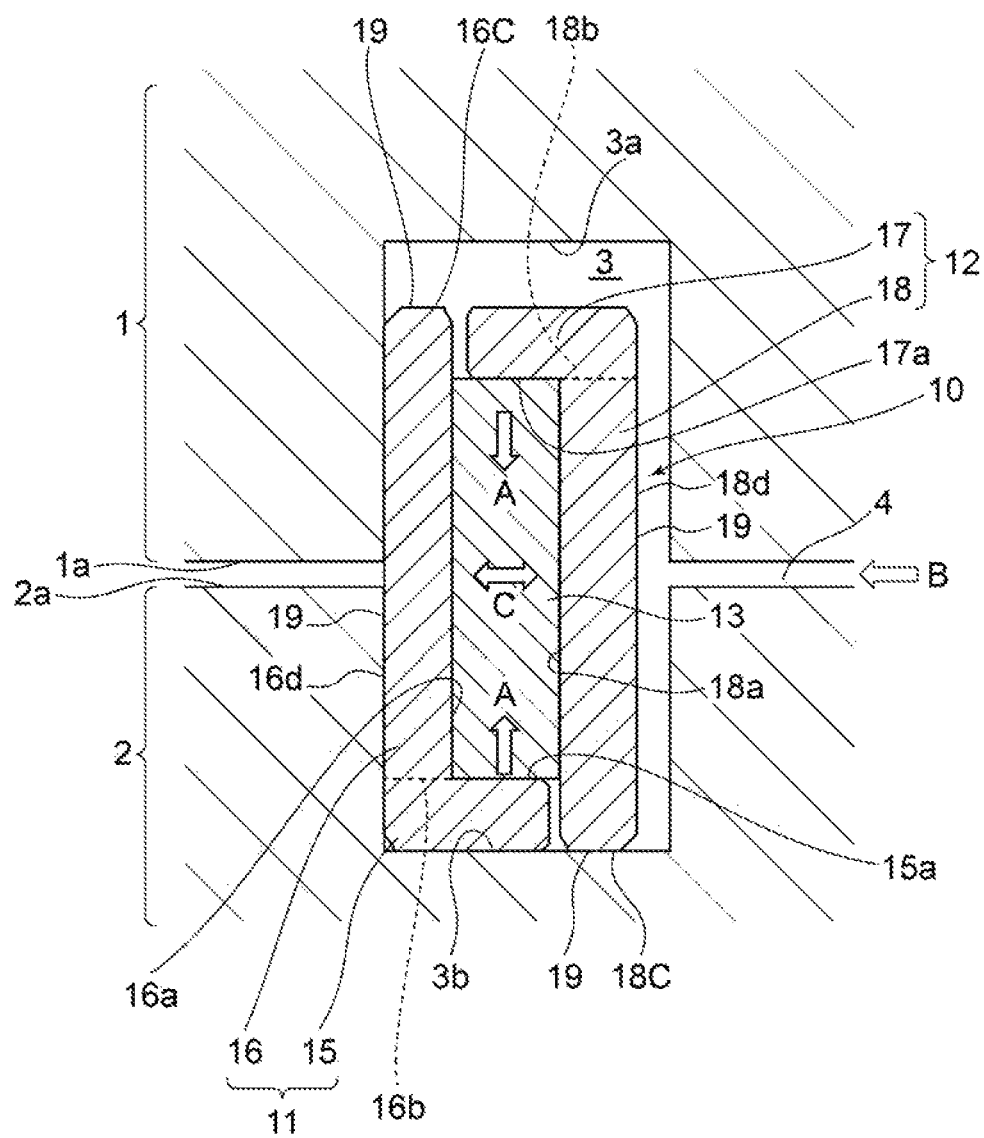
FIG. 7 is a cross-sectional view of the sealing mechanism according to Embodiment 2 of the present disclosure.

As shown in FIG. 7, in the sealing mechanism 10 according to Embodiment 2 of the present disclosure, the deformed nucleus member 13 is in contact with the internal surface 16*a* of the second portion 16 and the internal surface 18*a* of the fourth portion 18. However, the deformed nucleus member 13 may be fixed to the internal surface 16*a* of the second portion 16 and the internal surface 18*a* of the fourth portion 18. Using the appropriate metamaterial, the deformed nucleus member 13 is configured to contract in the direction where the distance between the first portion 15 and the third portion 17 decreases (the direction of the arrows A), and to expand in a direction where a distance between the second portion 16 and the fourth portion 18 increases (a direction of an arrow C), on the cross-section of the seal groove 3, along with the increase in temperature of the deformed nucleus member 13. Other configurations are the same as Embodiment 1.

Figure 8:
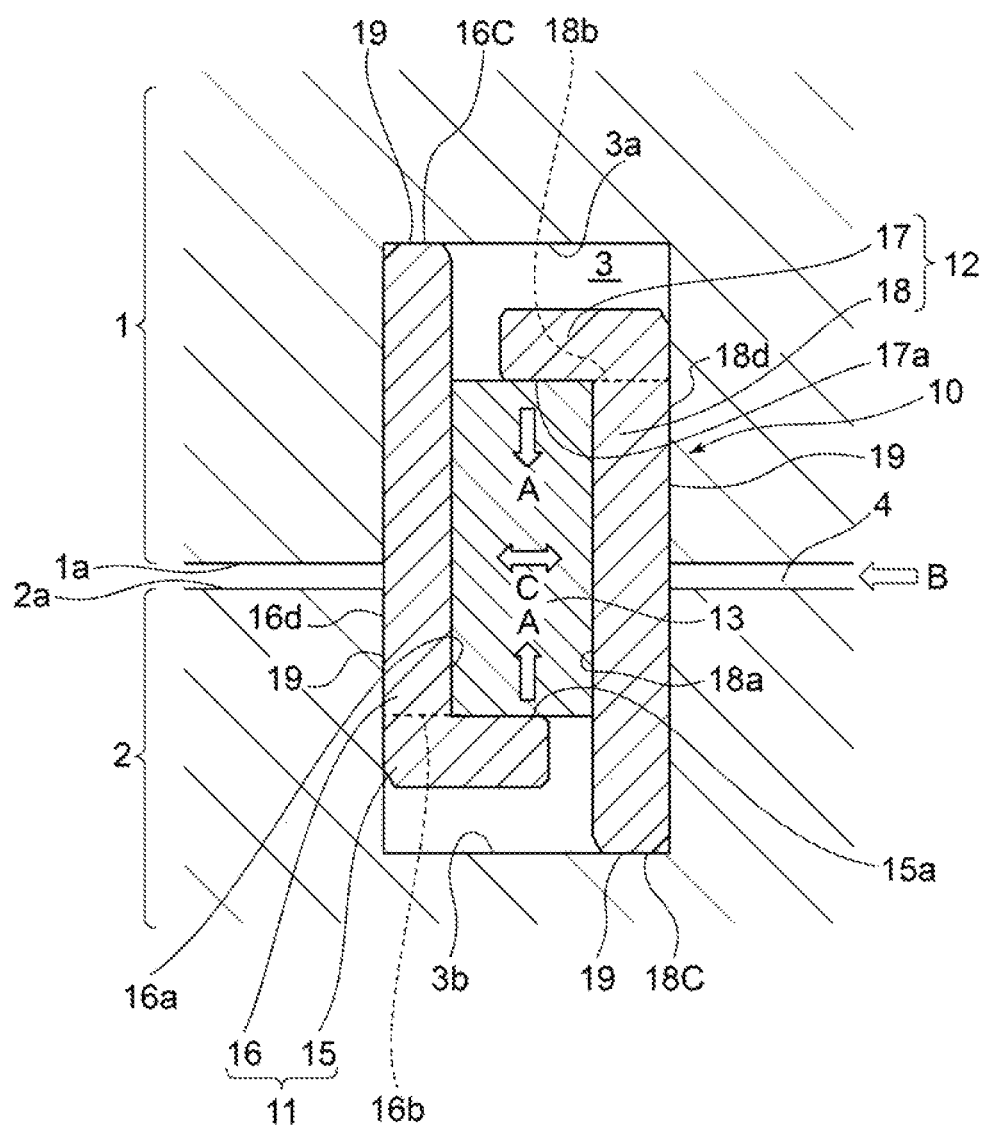
FIG. 8 is a cross-sectional view of the sealing mechanism according to Embodiment 2 of the present disclosure.

As shown in FIG. 8, if the temperature of the sealing mechanism 10 increases, and the deformed nucleus member 13 contracts in the direction where the distance between the first portion 15 and the third portion 17 decreases (the direction of the arrows A) on the cross-section of the seal groove 3, the abutment surface 19 formed at the edge 16c of the second portion 16 and the abutment surface 19 formed at the edge 18c of the fourth portion 18 abut on the inner surface of the seal groove 3, under the same principle as Embodiment 1.

Moreover, if the temperature of the sealing mechanism 10 increases, and the deformed nucleus member 13 expands in the direction where the distance between the second portion 16 and the fourth portion 18 increases (the direction of the arrow C) on the cross-section of the seal groove 3, the first seal member 11 and the second seal member 12 move relative to each other in a direction along the facing surfaces 1a and 2a, making each of the second portion 16 and the fourth portion 18 abut on the inner surface of the seal groove 3. The second portion 16 also has the abutment surface 19 formed on an external surface 16d on an opposite side to the internal surface 16a. The abutment surface 19 formed on the external surface 16d abuts on the inner surface of the seal groove 3. On the other hand, the fourth portion 18 also has the abutment surface 19 formed on an external surface 18d on an opposite side to the internal surface 18a. The abutment surface 19 formed on the external surface 18d abuts on the inner surface of the seal groove 3.

If the gas flowing through the gap 4 (in the direction of the arrow B) flows into the seal groove 3 with the abutment surfaces 19 formed at the edge 16c of the second portion 16 and the edge 18c of the fourth portion 18, respectively, and the abutment surfaces 19 formed on the external surface 16d of the second portion 16 and the external surface 18d of the fourth portion 18, respectively, abutting on the inner surface of the seal groove 3, the gas flow is sealed by a portion, where the abutment surfaces 19 abut on the inner surface of the seal groove 3, and the deformed nucleus member 13 in the seal groove 3, suppressing passage of the gas through the sealing mechanism 10.

As described above, sealing is performed not only by making the abutment surfaces 19 formed at the edge 16c of the second portion 16 and the edge 18c of the fourth portion 18, respectively, abut on the inner surface of the seal groove 3, but also by making the abutment surfaces 19 formed on the respective external surfaces 16d and 18d of the second portion 16 and the fourth portion 18, respectively, abut on the inner surface of the seal groove 3, accompanied by the expansion of the deformed nucleus member 13 where the distance between the second portion 16 and the fourth portion 18 increases. Thus, it is possible to improve the sealing performance needed at the time of the temperature increase.

Figure 9:
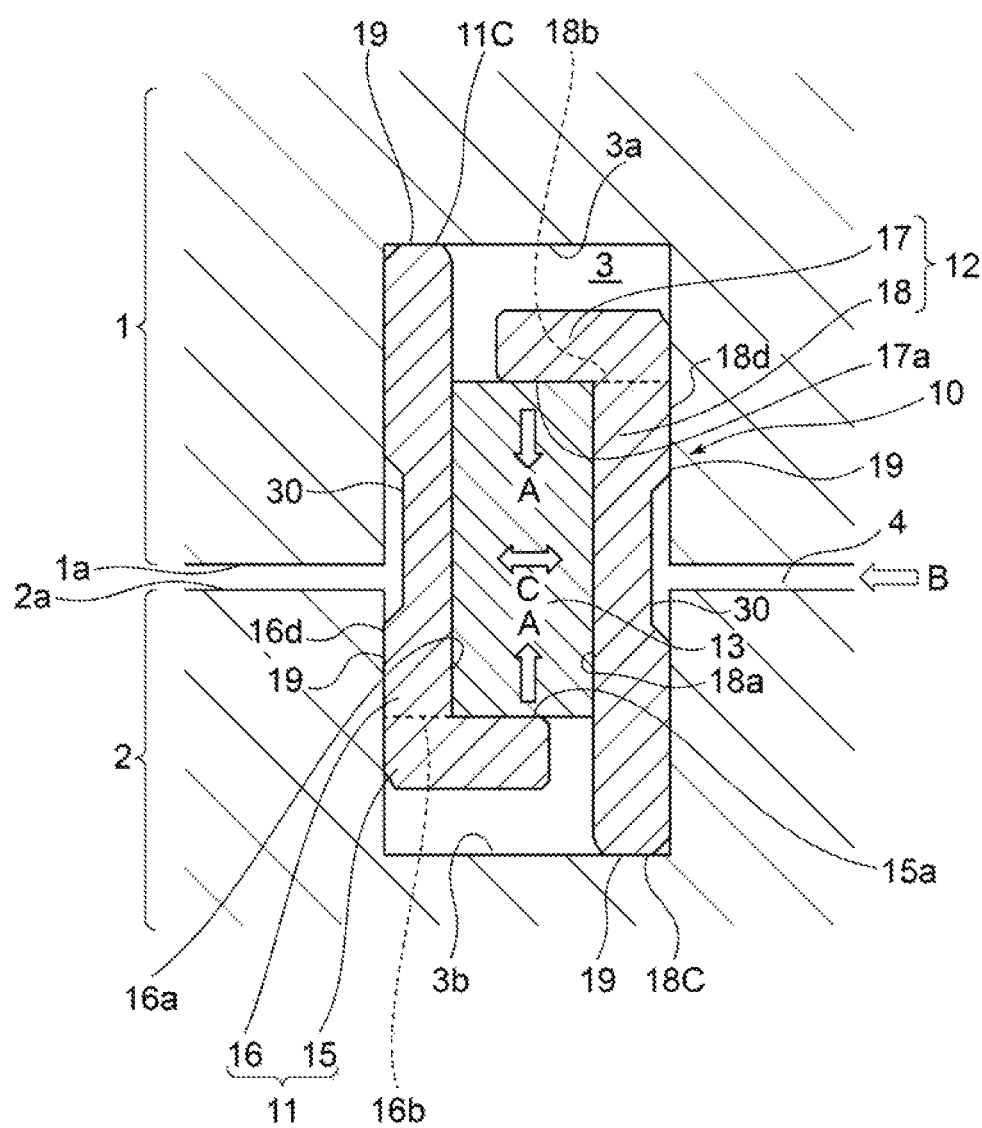
FIG. 9 is a cross-sectional view showing a modification of the sealing mechanism according to Embodiment 2 of the present disclosure.

In Embodiment 2, as shown in FIG. 9, recess 30 recessed with respect to the inner surface of the seal groove 3 may be formed in each of the external surfaces 16d and 18d. Forming the recess 30 in each of the external surfaces 16d and 18d, a pressure, at which the abutment surface 19 formed on each of the external surfaces 16d and 18d abuts on the inner surface of the seal groove 3, increases. Thus, it is possible to improve the sealing performance needed at the time of the temperature increase. In FIG. 9, the recess 30 is formed in each of the external surfaces 16d and 18d. However, the recess 30 may be formed in only one of the external surfaces 16d and 18d. Alternatively, the plurality of recesses 30 may be formed in at least one of the external surface 16d or 18d.

Embodiment 3

Next, the sealing mechanism according to Embodiment 3 will be described. The sealing mechanism according to Embodiment 3 is obtained by adding, to each of Embodiments 1 and 2, a sealing member for sealing the space 14. Embodiment 3 will be described below with a configuration obtained by adding the sealing member to the configuration of Embodiment 1. However, Embodiment 3 may be configured by adding the sealing member to the configuration of Embodiment 2. In Embodiment 3, the same constituent elements as those in Embodiment 1 are associated with the same reference characters and not described again in detail.

Figure 10:
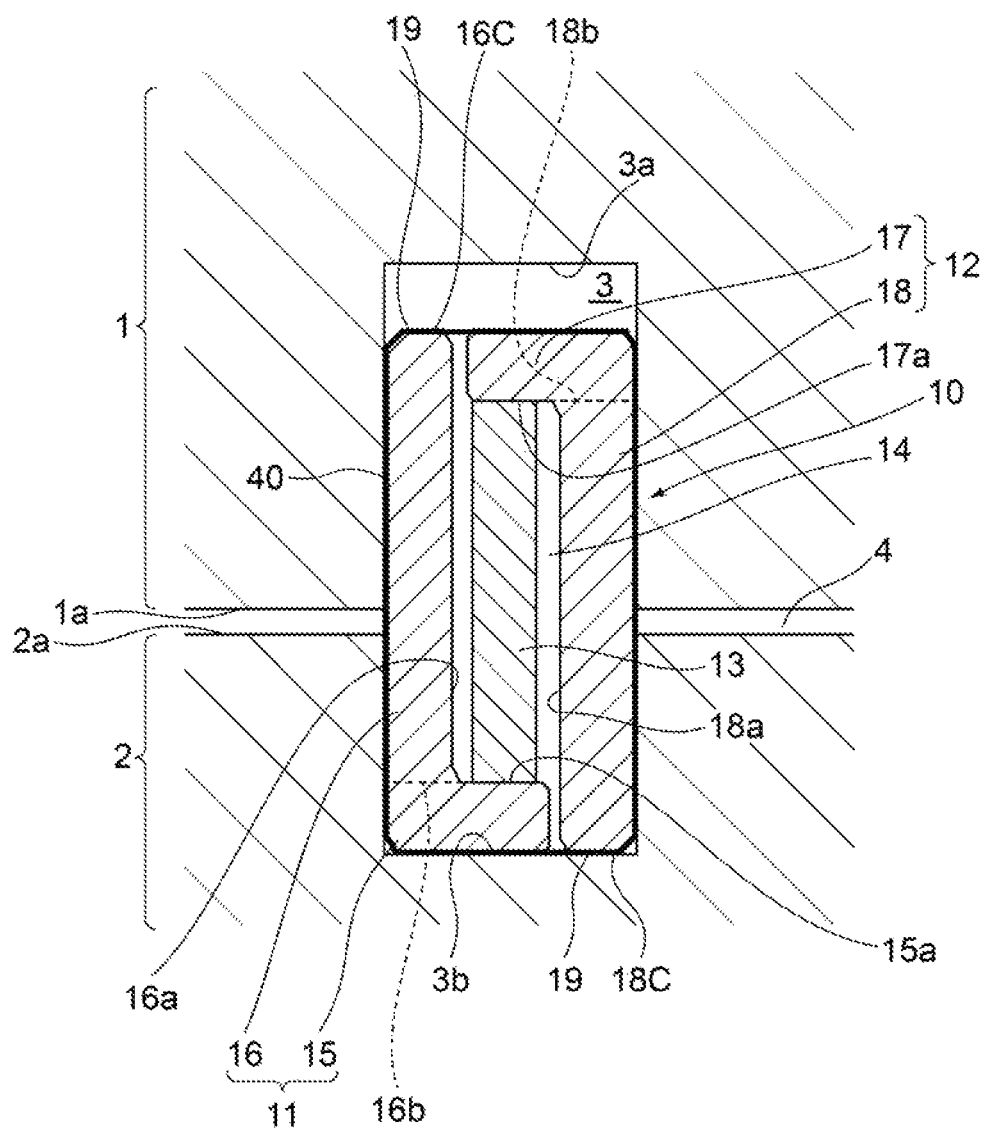
FIG. 10 is a cross-sectional view of the sealing mechanism according to Embodiment 3 of the present disclosure.

As shown in FIG. 10, the sealing mechanism 10 according to Embodiment 3 of the present disclosure further includes a sealing member 40 formed into a tube shape so as to internally include the first seal member 11, the second seal member 12, and the deformed nucleus member 13. The sealing member 40 needs to be formed by a material capable of withstanding the temperature increase and having a small heat insulating effect so that the temperature of the deformed nucleus member 13 in the sealing member 40 can be increased, needs to be formed thin to allow deformation when the first seal member 11 and the second seal member 12 move relative to each other, and further needs to be formed to shut off entrance/exist of the gas between the inside and outside of the sealing member 40. Therefore, it is possible to form the sealing member 40 into the thin tube shape, by using metal capable of withstanding the temperature increase. Other configurations are the same as Embodiment 1.

In Embodiment 1, as shown in FIG. 3, the gas flowing through the gap 4 (in the direction of the arrow B) flows into the seal groove 3, and then flows into the space 14 via a gap between the second portion 16 and the third portion 17. Using the configuration obtained by combining the plurality of rod-like members and plate-like members as the metamaterial 20 forming the deformed nucleus member 13, as described with reference to FIG. 2, a minute void exists inside the metamaterial 20. Thus, the gas flowing into the space 14 passes through the deformed nucleus member 13, and flows out of the space 14 via a gap between the first portion 15 and the fourth portion 18, thereby passing through the sealing mechanism 10, which may result in gas leakage.

Figure 11:
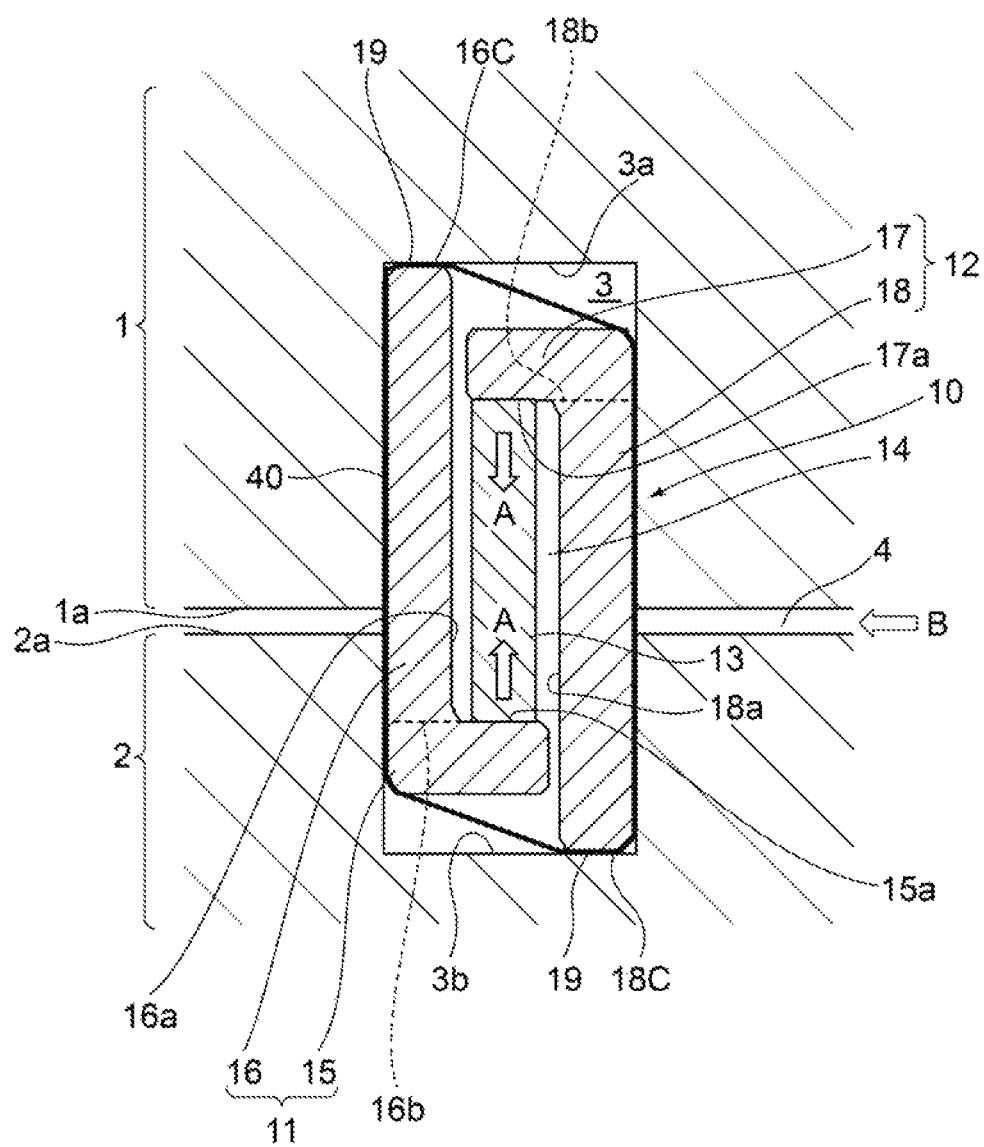
FIG. 11 is a cross-sectional view of the sealing mechanism according to Embodiment 3 of the present disclosure.

However, in Embodiment 3, as shown in FIG. 11, if the temperature of the sealing mechanism 10 increases, the abutment surfaces 19 formed at the edge 16c of the second portion 16 and the edge 18c of the fourth portion 18, respectively, abut on the inner surface of the seal groove 3 so as to interpose the sealing member 40 therebetween, under the same principle as Embodiment 1, inside the sealing member 40. With the sealing member 40, the gas in the seal groove 3 cannot flow into the space 14, preventing the gas from passing through the sealing mechanism 10. As described above, in the sealing mechanism 10, since the gas is sealed by making the abutment surfaces 19 formed at the edge 16c of the second portion 16 and the edge 18c of the fourth portion 18, respectively, abut on the inner surface of the seal groove 3 so as to interpose the sealing member 40 therebetween, it is possible to reduce the risk of the gas leakage.

In Embodiment 3, the sealing member 40 has the tube shape. However, various shapes are possible as in, for example, the configuration of Embodiment 4 to be described later. However, as in Embodiment 3, forming the sealing member 40 into the tube shape so as to internally include the first seal member 11, the second seal member 12, and the deformed nucleus member 13, it is possible to simplify the design of the sealing member 40.

Embodiment 4

Next, the sealing mechanism according to Embodiment 4 will be described. The sealing mechanism according to Embodiment 4 is obtained by modifying Embodiment 3 in the shape of the sealing member 40. In Embodiment 4, the same constituent elements as those in Embodiment 3 are associated with the same reference characters and not described again in detail.

Figure 12:
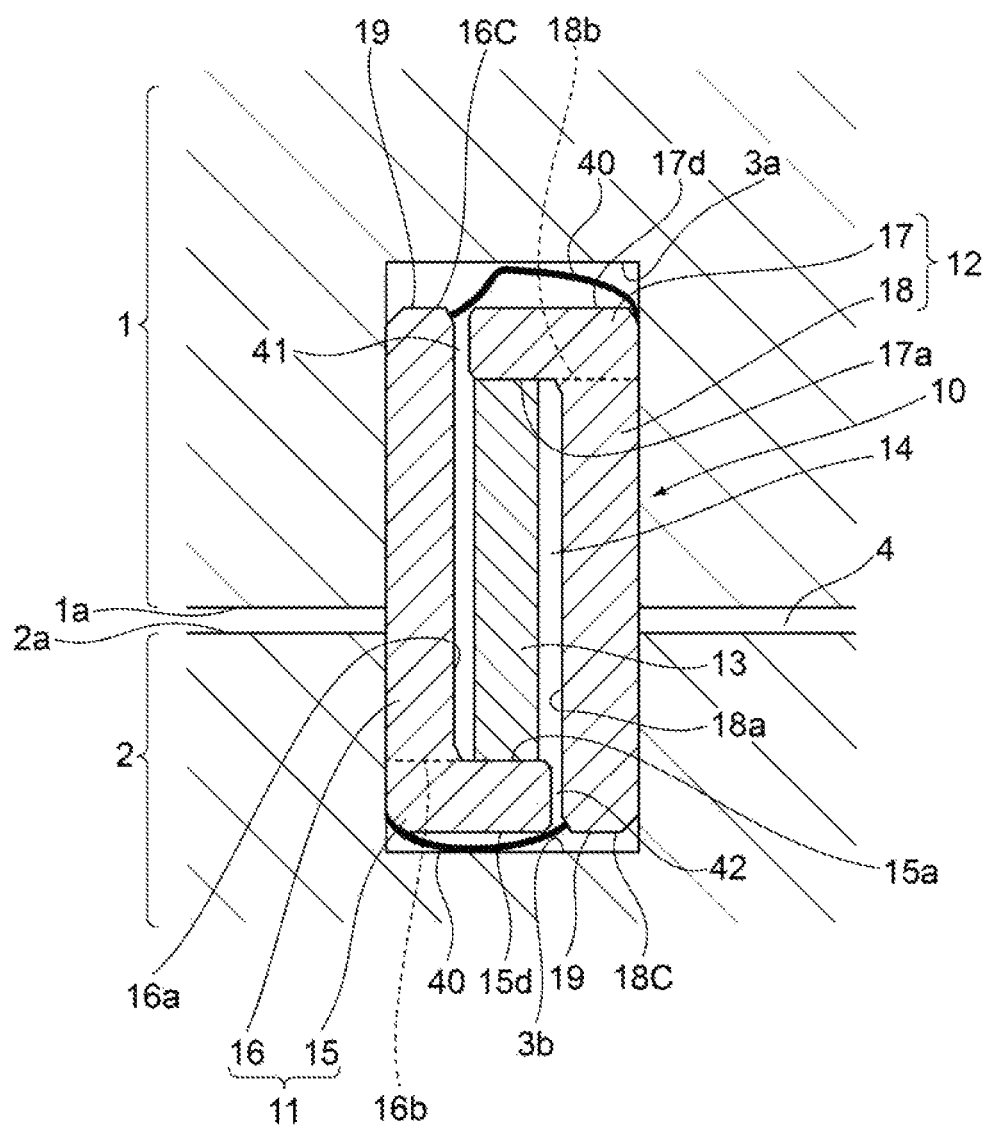
FIG. 12 is a cross-sectional view of the sealing mechanism according to Embodiment 4 of the present disclosure.

As shown in FIG. 12, the sealing mechanism 10 according to Embodiment 4 of the present disclosure further includes the sealing member 40 connected to the edge 16c of the second portion 16 and the external surface 17d of the third portion 17 so as to cover a gap 41 between the second portion 16 and the third portion 17, and the sealing member 40 connected to the external surface 15d of the first portion 15 and the edge 18c of the fourth portion 18 so as to cover a gap 42 between the first portion 15 and the fourth portion 18. The sealing members 40 can seal the space 14, together with the first seal member 11 and the second seal member 12. As in Embodiment 3, the sealing members 40 can be formed thin, by using metal capable of withstanding the temperature increase. Other configurations are the same as Embodiment 3.

Figure 13:
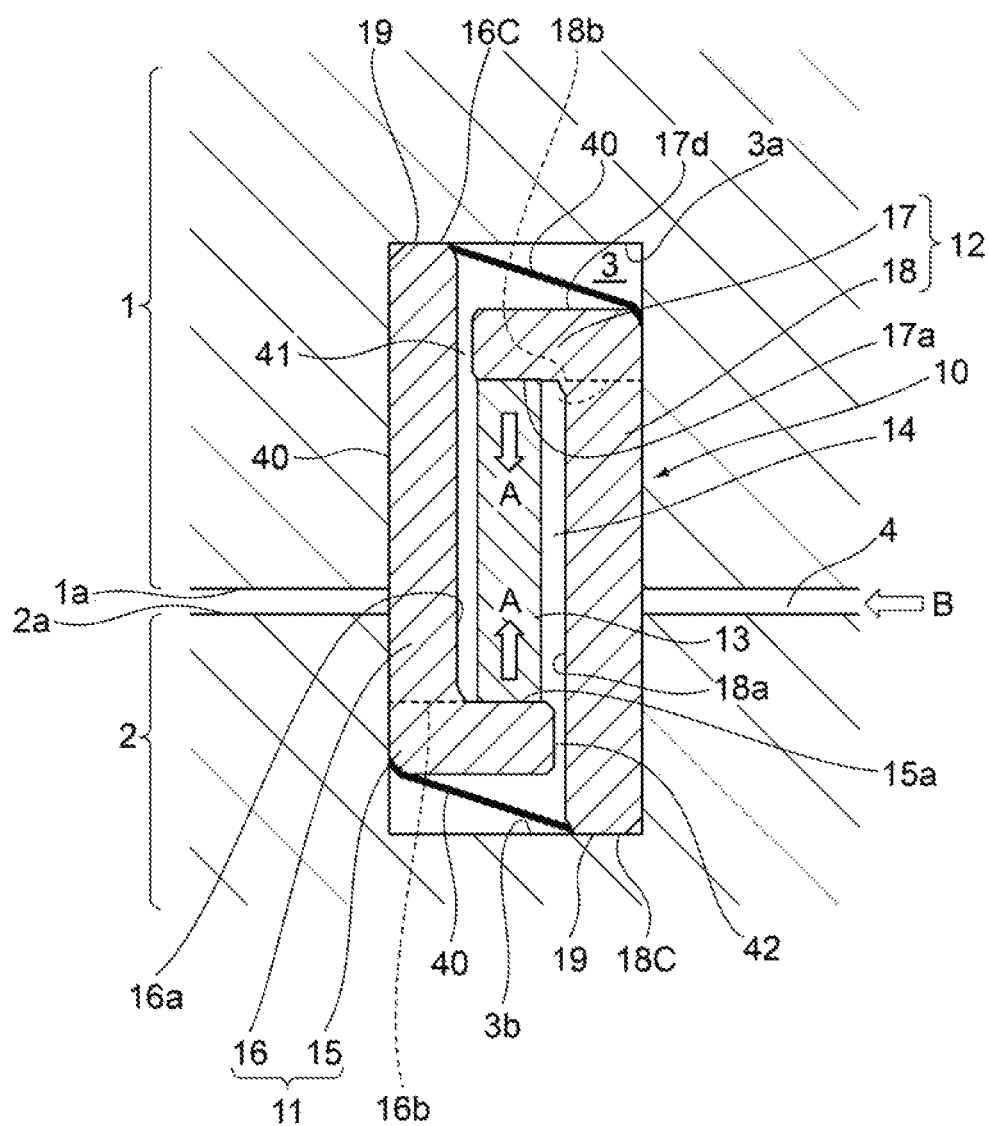
FIG. 13 is a cross-sectional view of the sealing mechanism according to Embodiment 4 of the present disclosure.

As shown in FIG. 13, if the temperature of the sealing mechanism 10 increases, the abutment surfaces 19 formed at the edge 16c of the second portion 16 and the edge 18c of the fourth portion 18, respectively, abut on the inner surface of the seal groove 3, under the same principle as Embodiment 1. With the sealing members 40, the gas in the seal groove 3 cannot flow into the space 14 via the gap 41, and the gas in the space 14 cannot flow out of the space via the gap 42, preventing the gas from passing through the sealing mechanism 10. As described above, in the sealing mechanism 10, since the gas is sealed by making the abutment surfaces 19 formed at the edge 16c of the second portion 16 and the edge 18c of the fourth portion 18, respectively, abut on the inner surface of the seal groove 3, it is possible to reduce the risk of the gas leakage.

When the abutment surfaces 19 formed at the edge 16c of the second portion 16 and the edge 18c of the fourth portion 18, respectively, abut on the inner surface of the seal groove 3, the sealing members 40 are preferably connected to the edge 16c of the second portion 16 and the edge 18c of the fourth portion 18, respectively, so as not to be positioned between the abutment surfaces 19 and the inner surface of the seal groove 3. The sealing performance may be decreased, if the abutment surfaces 19 abut on the inner surface of the seal groove 3 with the sealing members 40 existing between the abutment surfaces 19 and the inner surface of the seal groove 3. However, it is possible to suppress the decrease in sealing performance, by making the abutment surfaces 19 directly abut on the inner surface of the seal groove 3.

Since the sealing members 40 of Embodiment 4 are disposed only in sections to cover the gaps 41 and 42, respectively, it is possible to decrease the size of the sealing members 40, as compared with the case (Embodiment 3) in which the sealing member 40 is formed into the tube shape so as to internally include the first seal member 11, the second seal member 12, and the deformed nucleus member 13. Thus, it is possible to decrease the cost of the sealing members 40.

Embodiment 5

Next, the sealing mechanism according to Embodiment 5 will be described. The sealing mechanism according to Embodiment 5 is obtained by modifying Embodiment 1 in the deformed configuration of the deformed nucleus member 13 at the time of the temperature increase. In Embodiment 5, the same constituent elements as those in Embodiment 1 are associated with the same reference characters and not described again in detail.

Figure 14:
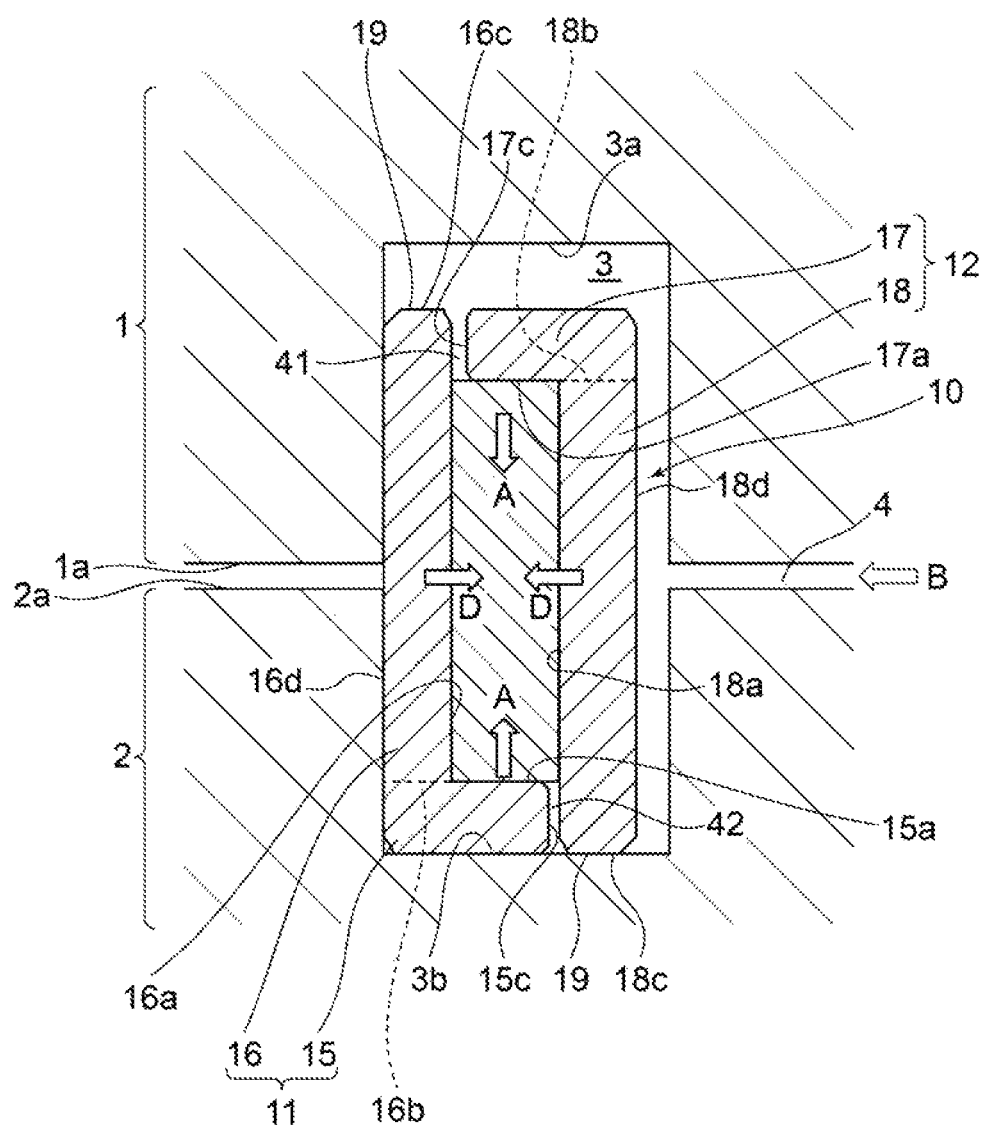
FIG. 14 is a cross-sectional view of the sealing mechanism according to Embodiment 5 of the present disclosure.

As shown in FIG. 14, in the sealing mechanism 10 according to Embodiment 5 of the present disclosure, the deformed nucleus member 13 is fixed to not only the internal surface 15a of the first portion 15 and the internal surface 17a of the third portion 17, but also the internal surface 16a of the second portion 16 and the internal surface 18a of the fourth portion 18. Using the appropriate metamaterial, the deformed nucleus member 13 is configured to contract in the direction where the distance between the first portion 15 and the third portion 17 decreases (the direction of the arrows A), and to contract in the direction where a distance between the second portion 16 and the fourth portion 18 decreases (a direction of arrows D), on the cross-section of the seal groove 3, along with the increase in temperature of the deformed nucleus member 13. Other configurations are the same as Embodiment 1.

Figure 15:
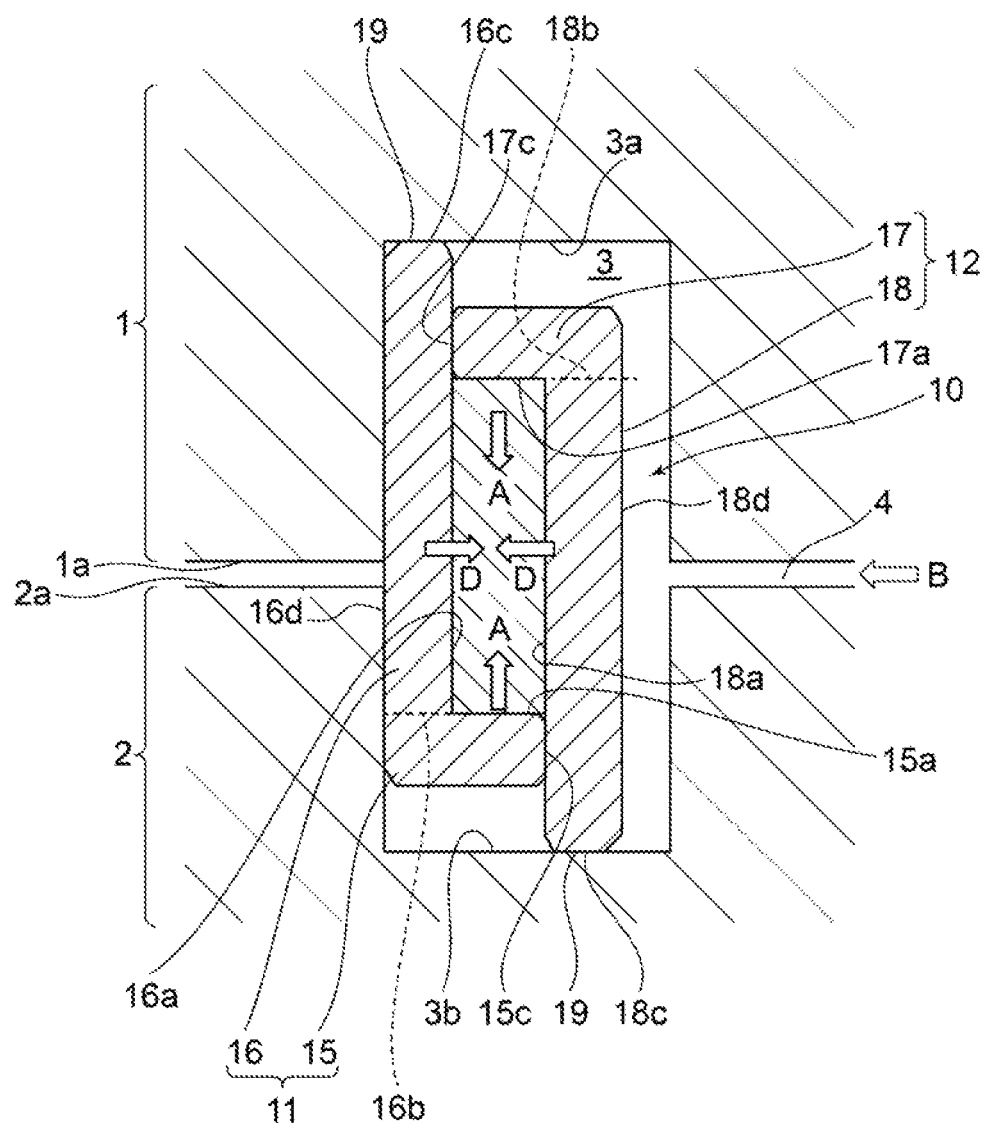
FIG. 15 is a cross-sectional view of the sealing mechanism according to Embodiment 5 of the present disclosure.

As shown in FIG. 15, if the temperature of the sealing mechanism 10 increases, and the deformed nucleus member 13 contracts in the direction where the distance between the first portion 15 and the third portion 17 decreases (the direction of the arrows A) on the cross-section of the seal groove 3, the abutment surface 19 formed at the edge 16c of the second portion 16 and the abutment surface 19 formed at the edge 18c of the fourth portion 18 abut on the inner surface of the seal groove 3, under the same principle as Embodiment 1.

Moreover, if the temperature of the sealing mechanism 10 increases, and the deformed nucleus member 13 contracts in the direction where the distance between the second portion 16 and the fourth portion 18 decreases (the direction of the arrows D) on the cross-section of the seal groove 3, the first seal member 11 and the second seal member 12 move relative to each other in the direction along the facing surfaces 1a and 2a, eliminating the gap 42 (see FIG. 14) by making an edge 15c of the first portion 15 abut on the internal surface 18a of the fourth portion 18, and eliminating the gap 41 (see FIG. 14) by making an edge 17c of the third portion 17 abut on the internal surface 16a of the second portion 16.

If the gas flowing through the gap 4 (in the direction of the arrow B) flows into the seal groove 3, the gas cannot flow into the space 14 (see FIG. 1), since the gaps 41 and 42 are eliminated. Therefore, the gas cannot pass through the sealing mechanism 10 via the space 14 by passing through the deformed nucleus member 13. As described above, in the sealing mechanism 10, since the gas is sealed by making the abutment surfaces 19 formed at the edge 16c of the second portion 16 and the edge 18c of the fourth portion 18, respectively, abut on the inner surface of the seal groove 3, it is possible to reduce the risk of the gas leakage.

Embodiment 6

Next, the sealing mechanism according to Embodiment 6 will be described. The sealing mechanism according to Embodiment 6 is obtained by modifying Embodiment 1 in the configurations of the seal member 11 and the inner surface of the seal groove 3. In Embodiment 6, the same constituent elements as those in Embodiment 1 are associated with the same reference characters and not described again in detail.

Figure 16:
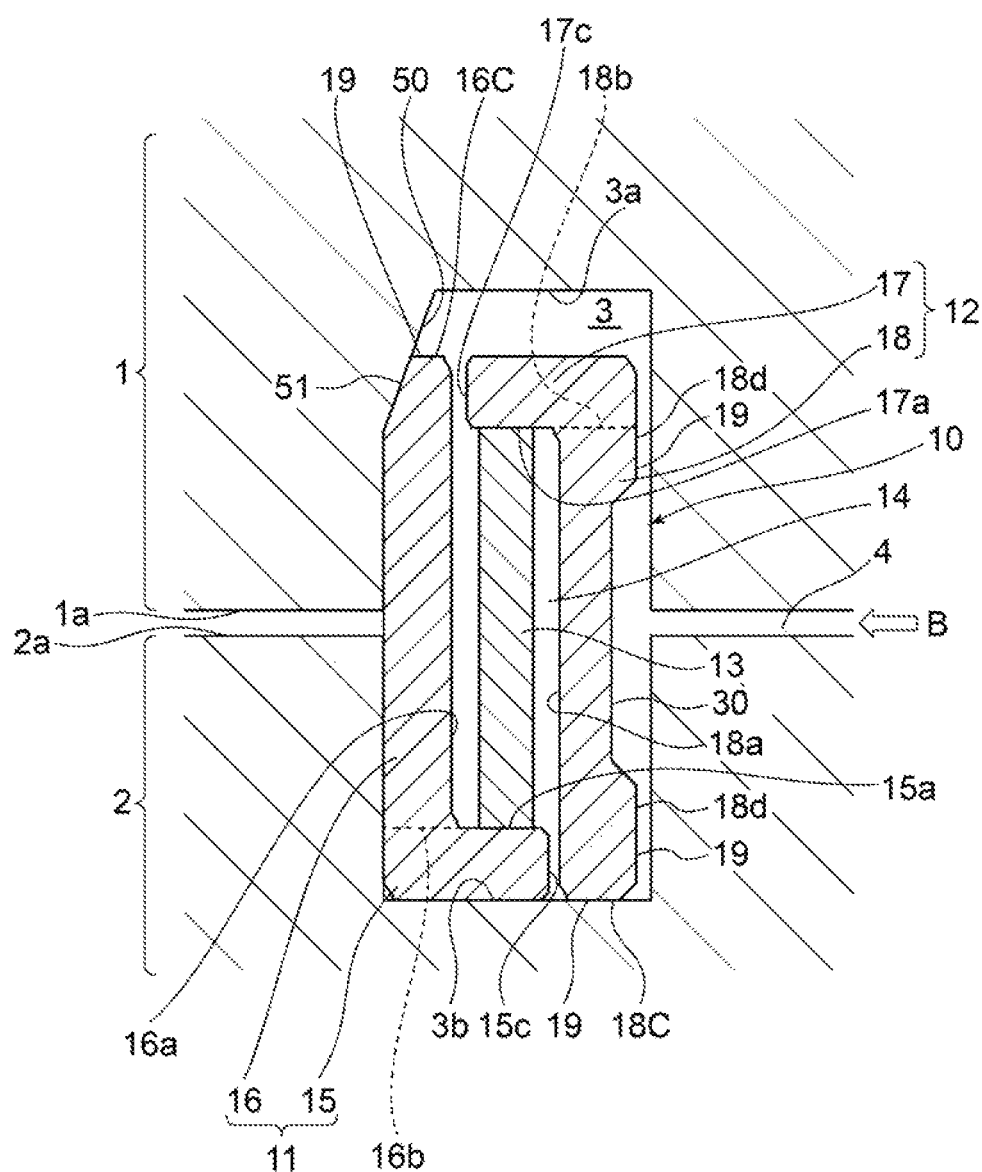
FIG. 16 is a cross-sectional view of the sealing mechanism according to Embodiment 6 of the present disclosure.

As shown in FIG. 16, in Embodiment 6, the inner surface of the seal groove 3 includes, in the groove part 3a constituting the seal groove 3, an abutment inner surface part 50 forming an acute angle with an extending direction of the second portion 16 on the cross-section of the seal groove 3. The second portion 16 has a second abutment surface 51 extending from the edge 16c to the external surface 16d. On the cross-section of the seal groove 3, an angle between the second abutment surface 51 and the extending direction of the second portion 16 is equal to the angle between the abutment inner surface part 50 and the extending direction of the second portion 16. Therefore, the second abutment surface 51 can abut on the abutment inner surface part 50. Although not an essential component in Embodiment 6, the recess 30 recessed with respect to the inner surface of the seal groove 3 may be formed in the external surface 18d of the fourth portion 18. Other configurations are the same as Embodiment 1 (except for Modification 3).

Figure 17:
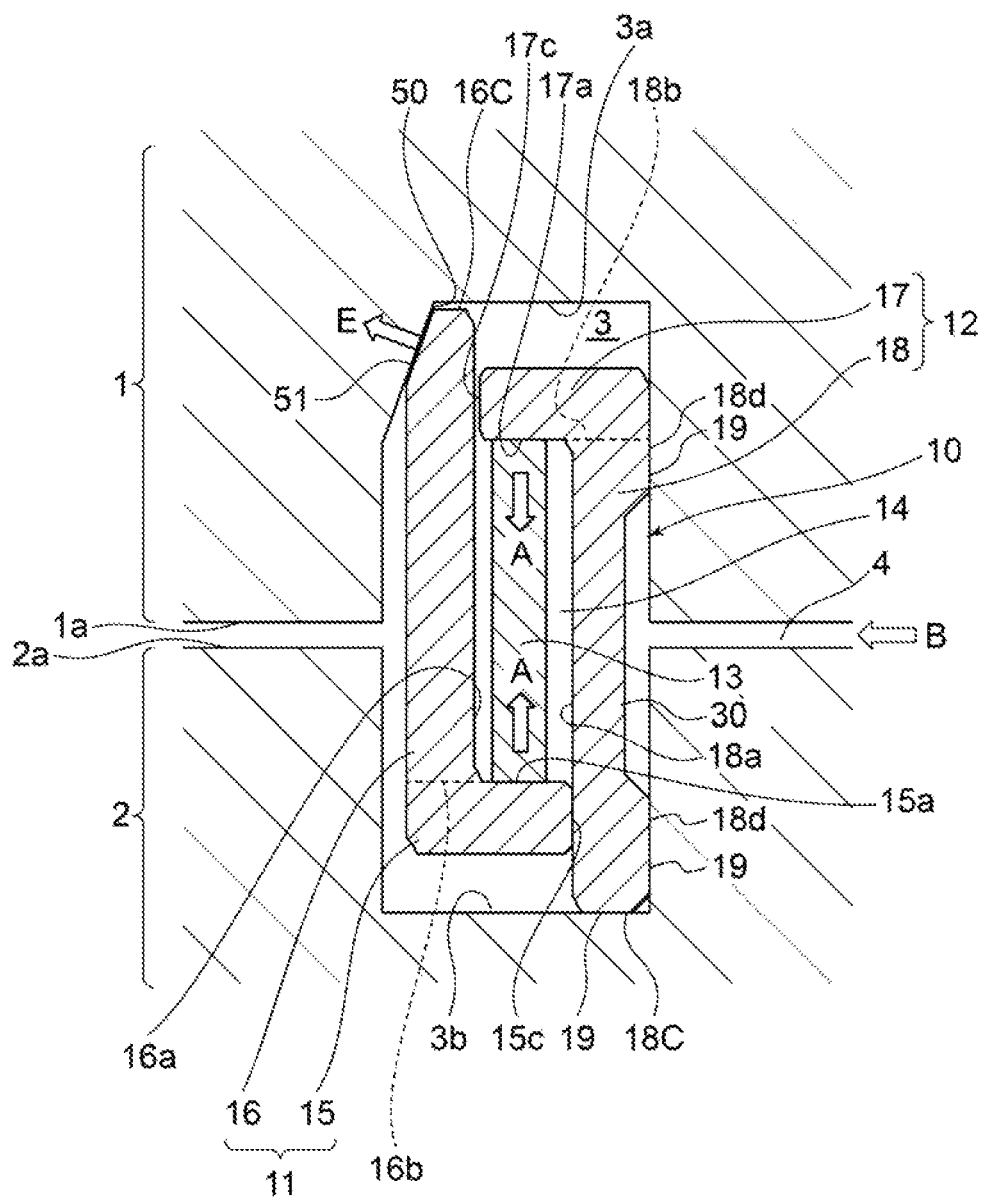
FIG. 17 is a cross-sectional view of the sealing mechanism according to Embodiment 6 of the present disclosure.

As shown in FIG. 17, if the temperature of the sealing mechanism 10 increases, and the deformed nucleus member 13 contracts in the direction where the distance between the first portion 15 and the third portion 17 decreases (the direction of the arrows A) on the cross-section of the seal groove 3, the first seal member 11 and the second seal member 12 move relative to each other in the direction crossing the facing surfaces 1a and 2a, that is, in the direction perpendicular to the facing surfaces 1a and 2a. The first seal member 11 moves while the second abutment surface 51 abuts on the abutment inner surface part 50, and thus the first seal member 11 also moves in a direction toward the second seal member 12 by a reaction force E applied to the abutment inner surface part 50 by the second abutment surface 51.

As the first seal member 11 moves while the second abutment surface 51 abuts on the abutment inner surface part 50, the first seal member 11 abuts on the second seal member 12, that is, the edge 15c of the first portion 15 abuts on the internal surface 18a of the fourth portion 18, and the internal surface 16a of the second portion 16 abuts on the edge 17c of the third portion 17. If the first seal member 11 further moves while the second abutment surface 51 abuts on the abutment inner surface part 50, the first seal member 11 pushes the second seal member 12 in the direction along the facing surfaces 1a, 2a, and the second seal member 12 moves until the abutment surface 19 formed on the external surface 18d of the fourth portion 18 abuts on the inner surface of the seal groove 3. Moreover, the second seal member 12 moves until the abutment surface 19 formed at the edge 18c of the fourth portion 18 abuts on the inner surface of the seal groove 3, under the same principle as Embodiment 1.

In this state, the second abutment surface 51 abuts on the abutment inner surface part 50, and the abutment surface 19 formed on the external surface 18d of the fourth portion 18 and the abutment surface 19 formed at the edge 18c of the fourth portion 18 abut on the inner surface of the seal groove 3, thereby sealing the gas flowing through the gap 4 (in the direction of the arrow B), and then flowing into the seal groove 3. Thus, it is possible to improve the sealing performance needed at the time of the temperature increase, as compared with Embodiment 1 where the abutment surfaces 19 formed at the edge 16c of the second portion 16 and the edge 18c of the fourth portion 18, respectively, abut on the inner surface of the seal groove 3.

Furthermore, since the edge 15c of the first portion 15 abuts on the internal surface 18a of the fourth portion 18, and the internal surface 16a of the second portion 16 abuts on the edge 17c of the third portion 17, the gas in the seal groove 3 cannot flow into the space 14. Thus, since the gas trying to pass through the sealing mechanism 10 via the space 14 is sealed, it is possible to suppress the passage of the gas through the sealing mechanism 10, and to reduce the risk of the gas leakage.

In Embodiment 6, if the recess 30 is formed in the external surface 18d of the fourth portion 18, a pressure, at which the abutment surface 19 formed on the external surface 18d of the fourth portion 18 abuts on the inner surface of the seal groove 3, increases, making it possible to improve the sealing performance needed at the time of the temperature increase.

In Embodiment 6, the abutment inner surface part 50 is formed in the groove part 3a. However, the abutment inner surface part 50 may be formed in the groove part 3b. In this case, the sealing mechanism 10 can be disposed in the seal groove 3 by adjusting the orientation of the sealing mechanism 10 such that the second abutment surface 51 faces the abutment inner surface part 50.

REFERENCE SIGNS LIST

1 Upper flange (member)
1a Facing surface (of upper flange)
2 Lower flange (member)
2a Facing surface (of lower flange)
3 Seal groove
3a Groove part
3b Groove part
4 Gap
5 Clearance
10 Sealing mechanism
11 First seal member
11a Internal surface (of first seal member)
11c Edge (of first seal member)
12 Second seal member
12a Internal surface (of second seal member)
12c Edge (of second seal member)
13 Deformed nucleus member
13a Protruding part
13b Protruding part
14 Space
15 First portion
15a Internal surface (of first portion)
15c Edge (of first portion)
15d External surface (of first portion)
16 Second portion
16a Internal surface (of second portion)
16b Connection part (of second portion)
16c Edge (of second portion)
16d External surface (of second portion)
17 Third portion 17a Internal surface (of third portion)
17c Edge (of third portion)
17d External surface (of third portion)
18 Fourth portion
18a Internal surface (of fourth portion)
18b Connection part (of fourth portion)
18c Edge (of fourth portion)
18d External surface (of fourth portion)
19 Abutment surface
20 Metamaterial
21 Base
22 Base
23 Base
24 Beam
30 Recess
40 Sealing member
41 Gap
42 Gap
50 Abutment inner surface part
51 Second abutment surface

The invention claimed is:

1. A sealing mechanism inserted into a seal groove formed between facing surfaces of two members,
the sealing mechanism comprising:
a first seal member;
a second seal member arranged so as to face the first seal member; and
a deformed nucleus member arranged in a space formed at least partially between the first seal member and the second seal member, and becoming a nucleus of deformation in the sealing mechanism, the deformed nucleus member being configured by a combination of a plurality of rod-like members and plate-like members respectively formed from a plurality of materials having different linear expansion coefficients, and being fixed to each of the first seal member and the seal member,
wherein the deformed nucleus member contracts in at least one direction on a cross-section of the seal groove, along with an increase in temperature of the deformed nucleus member, and
wherein the first seal member and the second seal member respectively have abutment surfaces abutting on an inner surface of the seal groove or the facing surfaces, accompanied by the contraction of the deformed nucleus member.

2. The sealing mechanism according to claim 1,
wherein the first seal member has a substantially L-shaped cross-sectional shape, which is formed by connecting a plate-like first portion and a plate-like second portion to each other,
wherein the second seal member has a substantially L-shaped cross-sectional shape, which is formed by connecting a plate-like third portion facing the first portion and a plate-like fourth portion facing the second portion to each other,
wherein the deformed nucleus member is fixed to each of the first portion and the third portion, and contracts such that a distance between the first portion and the third portion decreases, along with the increase in temperature of the deformed nucleus member,
wherein, accompanied by the contraction of the deformed nucleus member, an edge of the second portion facing a connection part with the first portion and an edge of the fourth portion facing a connection part with the third portion abut on the inner surface of the seal groove or the facing surfaces, and
wherein the abutment surfaces are formed at the edge of the second portion and the edge of the fourth portion, respectively.

3. The sealing mechanism according to claim 2,
wherein the deformed nucleus member further expands such that a distance between the second portion and the fourth portion increases, along with the increase in temperature of the deformed nucleus member, and accompanied by the expansion of the deformed nucleus member, respective external surfaces on opposite sides to respective internal surfaces of the second portion and the fourth portion abut on the inner surface of the seal groove or the facing surfaces, the respective internal surfaces facing the deformed nucleus member, and
wherein the abutment surfaces are further formed on the external surface of the second portion and the external surface of the fourth portion, respectively.

4. The sealing mechanism according to claim 3,
wherein, in at least one of the external surface of the second portion and the external surface of the fourth portion, a recess is formed, which is recessed with respect to the inner surface of the seal groove or the facing surfaces.

5. The sealing mechanism according to claim 2,
wherein the deformed nucleus member is further fixed to each of the second portion and the fourth portion, and
wherein the deformed nucleus member further contracts such that a distance between the second portion and the fourth portion decreases, along with the increase in temperature of the deformed nucleus member, to make the first portion abut on the fourth portion and to make the third portion abut on the second portion.

6. The sealing mechanism according to claim 1, further comprising a sealing member for sealing the space.

7. The sealing mechanism according to claim 6,
wherein the sealing member has a tube shape internally including the first seal member, the second seal member, and the deformed nucleus member.

8. The sealing mechanism according to claim 6,
wherein the sealing member seals the space, together with the first seal member and the second seal member.

9. The sealing mechanism according to claim 1,
wherein the first seal member has a substantially L-shaped cross-sectional shape, which is formed by connecting a plate-like first portion and a plate-like second portion to each other,
wherein the second seal member has a substantially L-shaped cross-sectional shape, which is formed by connecting a plate-like third portion facing the first portion and a plate-like fourth portion facing the second portion to each other,
wherein the deformed nucleus member is fixed to each of the first portion and the third portion, and contracts such that a distance between the first portion and the third portion decreases, along with the increase in temperature of the deformed nucleus member,
wherein the inner surface of the seal groove has an abutment inner surface part forming an acute angle with the second portion,
wherein the second portion has a second abutment surface abutting on the abutment inner surface part, accompanied by the contraction of the deformed nucleus member,
wherein, with the abutment of the second abutment surface on the abutment inner surface part, the first seal member pushes the second seal member to make the first portion abut on the fourth portion and to make the third portion abut on the second portion, and of a surface of the fourth portion, an external surface on an opposite side to an internal surface facing the deformed nucleus member abuts on the inner surface of the seal groove, and wherein the abutment surfaces are formed on the external surface and the edge of the fourth portion facing a connection part with the third portion, respectively.

10. The sealing mechanism according to claim 9,
wherein, in the external surface of the fourth portion, a recess is formed, which is recessed with respect to the inner surface of the seal groove.

* * * * *